(12) United States Patent
Oota

(10) Patent No.: US 7,040,193 B2
(45) Date of Patent: May 9, 2006

(54) DIFFERENTIAL APPARATUS

(75) Inventor: Yoshitaka Oota, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 118 days.

(21) Appl. No.: 10/863,891

(22) Filed: Jun. 8, 2004

(65) Prior Publication Data

US 2004/0250649 A1    Dec. 16, 2004

(30) Foreign Application Priority Data

Jun. 12, 2003    (JP)    ............................ 2003-168009

(51) Int. Cl.
*F16H 48/12* (2006.01)
*F16H 63/00* (2006.01)
*F16D 11/06* (2006.01)
*F16D 13/24* (2006.01)

(52) U.S. Cl. .................... 74/650; 74/337.5; 192/70; 192/70.15

(58) Field of Classification Search .............. 74/650, 74/337.5, 355, 359; 192/69.5, 70, 70.15, 192/35–38, 53.1–53.6

See application file for complete search history.

(56) References Cited

U.S. PATENT DOCUMENTS 1,931,288 A * 10/1933 Griswold ............... 192/53.361
5,967,276 A * 10/1999 Leichliter et al. .............. 192/35

FOREIGN PATENT DOCUMENTS

JP    08318745    12/1996

* cited by examiner

*Primary Examiner*—Tisha Lewis
(74) *Attorney, Agent, or Firm*—Adams & Wilks

(57) ABSTRACT

Ball member is provided between a ball retaining member provided integrally with a driving rotational member and opposed axial end portions of left and right drive shafts, and a selection can be made as necessary between a non-differential operation mode where the drive shafts rotate substantially equally and a differential operation mode where the drive shafts rotate differentially. The retaining member has a through-hole portion to receive part of the ball member. Shift member is slidably fitted over the retaining member and includes a ball-restricting portion of an inner diameter generally equal to an outer diameter of the retaining member and a ball-releasing portion having a greater inner diameter than the restricting portion. Power-transmitting portions are provided on the opposed axial ends with which the ball member is engageable to transmit the driving power.

2 Claims, 17 Drawing Sheets

DIFFERENTIAL APPARATUS

FIELD OF THE INVENTION

The present invention relates to differential devices which are equipped with a function for permitting differential operation between left and right vehicle wheels and a function for not permitting such differential operation, and which allow a human operator to select either one of these two functions as needed.

BACKGROUND OF THE INVENTION

Generally, in the conventional differential devices, driving power produced by an engine is transmitted from a primary transmission member, via ball members (i.e., ball-shaped power-transmitting movable members), to secondary transmission members to thereby drive left and right vehicle wheels (i.e., road wheels). When the vehicle is to be turned left or right, the ball members associated with the inner wheel (i.e., the left wheel when the vehicle is turning left, or the right wheel when the vehicle is turning right) are disengaged from the corresponding secondary transmission members so that the left and right wheels are caused to operate in a differential manner. One example of such conventional differential devices is disclosed, for example, in Japanese Patent Laid-Open Publication No. HEI-8-318745.

FIG. 17 hereof is a sectional view of the conventional differential device for an agricultural working machine disclosed in Publication HEI-8-318745. The disclosed differential device comprises two engaging/disengaging mechanisms 8 for driving left and right axles 4. The engaging/disengaging mechanisms 8 include a cylindrical primary transmission member 81 having a sprocket 29T integrally formed thereon, and the primary transmission member 81 also has three horizontally-elongated through-holes 81a formed at predetermined circumferential intervals, three coil springs 80a and three regulating pin 80b. The engaging/disengaging mechanisms 8 also include disk-shaped secondary transmission members 82 opposed to opposite end surfaces of the primary transmission member 81, and each of the secondary transmission members 82 has three ball-engaging grooves 82a formed in its inner side surface. Two movable members (in this instance, ball members) 80 are accommodated in each of the holes 81a. When a load applied to either one of the axles 4, for example, from the earth has exceeded a predetermined value, the corresponding ball members 80 associated with the axle 4 are displaced from their engaged positions in the respective engaging grooves 82a to their released positions, to thereby cut off the power transmission. Thus, whenever necessary, the machine can be appropriately turned to a desired direction without a human operator having to manipulate any particular lever.

However, because the engaging/disengaging mechanisms 8, employed in the agricultural working machine disclosed in Publication HEI-8-318745, is arranged to cut off the power transmission to the wheel 4 once the load from the earth to the wheel has exceeded the predetermined value, there is a possibility of the wheel undesirably stopping their rotation during agricultural work. For example, as the wheels get buried or stuck in cultivated soil, resistance to the rotation of the wheels increase, which may automatically activate the engaging/disengaging mechanisms 8 to stop the rotation of the wheels at an unintended time; in this case, it would take a considerable amount of time and labor for the human operator to get the wheels out of the cultivated soil.

SUMMARY OF THE INVENTION

In view of the foregoing prior art problems, it is an object of the present invention to provide a differential device which can reliably drive left and right wheels of a vehicle, during cultivating or other work, to thereby prevent the wheels from readily getting buried or stuck in soil or earth and allow the wheels to readily get out from the earth when unfortunately buried or stuck in the earth, which permits appropriate differential operation of the wheels when the vehicle is to be turned, and which can be manufactured at reduced cost.

In order to accomplish the above-mentioned object, the present invention provides an improved differential device operable selectively in a non-differential operation mode and a differential operation mode, which comprises: a ball member; a ball retaining member rotatable with a driving rotational member and extending along opposed axial end portions of left and right drive shafts, the ball member being disposed between the ball retaining member and the opposed axial end portions of the left and right drive shafts, the ball retaining member having a through-hole portion formed therein to receive part of the ball member; a shift member fitted over the ball retaining member and including: a ball-restricting portion of an inner diameter generally equal to an outer diameter of the ball retaining member; and a ball-releasing portion having a greater inner diameter than the ball-restricting portion; an actuator for sliding the shift member, along the ball retaining member, from a ball-releasing position to a ball-restricting position when the non-differential operation mode is selected, but from the ball-restricting position to the ball-releasing position when the differential operation mode is selected; and a pair of opposed power-transmitting portions provided on respective ones of the axial ends of the left and right drive shafts and together defining a recessed portion of a predetermined sectional shape such that, when the shift member is in the ball-restricting position, the ball member is placed, via the ball-restricting portion, in engagement with the power-transmitting portions to thereby transmit a driving power from the rotational member to both of the left and right drive shafts, but, when the shift member is in the ball-releasing position, the ball member is allowed to move radially outward into engagement with only one of the power-transmitting portions to thereby permit differential rotation of the left and right drive shafts.

The differential device is applicable suitably to an agricultural working machine or other type of vehicle. For example, when desired work, such as earth-cultivating work, is to be performed by the vehicle employing the differential device of the invention, the shift member is shifted to the ball-restricting position, so that the ball-restricting portion of the shift member restricts the ball member from moving in the radial direction of the shift member, i.e. keeps the ball member engaged in the opposed power-transmitting portions without a possibility of the ball member being accidentally disengaged from the power-transmitting portions. Thus, the ball member transmits a driving power from the rotational member to the left and right drive shafts, by pressing against the power-transmitting portions of the left and right drive shafts in a rotating direction of the shafts. Therefore, the ball member can reliably transmit the power to the left and right drive shafts without causing differential operation between the left and right drive shafts due to resistance, from the earth, to the rotation of the wheels, for example, when the wheels are buried or stuck in soft earth.

When the vehicle employing the differential device of the invention is to be turned, on the other hand, the differential operation mode is selected, and the shift member is slidingly shifted, via an actuator (or lock/release) member, from the ball-restricting position to the ball-releasing position, upon which the ball member is released from the restricting portion to the greater-diameter releasing portion of the shift member and allowed to move in a radial outward direction in the releasing portion via the through-hole portion. Thus, as resistance is applied from an operating handle to the rotation of the right wheel, for example, the ball member is directed radially outwardly, along a slanted front contact surface of the corresponding power-transmitting portion, onto a non-power-transmitting portion adjoining the power-transmitting portion and into the other power-transmitting portion. Thus, differential operation between the left and right drive shafts can be performed by the ball member repeating such movement.

Namely, the differential device of the invention is merely constructed of: the ball retaining member having the through-hole portion; the shift member having the ball-restricting portion and ball-releasing portion; and the power-transmitting portions formed on the left and right drive shafts, and thus, it can be manufactured without requiring any high-precision manufacturing and at reduced cost.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

It should be noted that the terms "front", "rear", "left", "right", "upper", "lower", etc. used herein represent various directions as viewed from a human operator.

Figure 1:
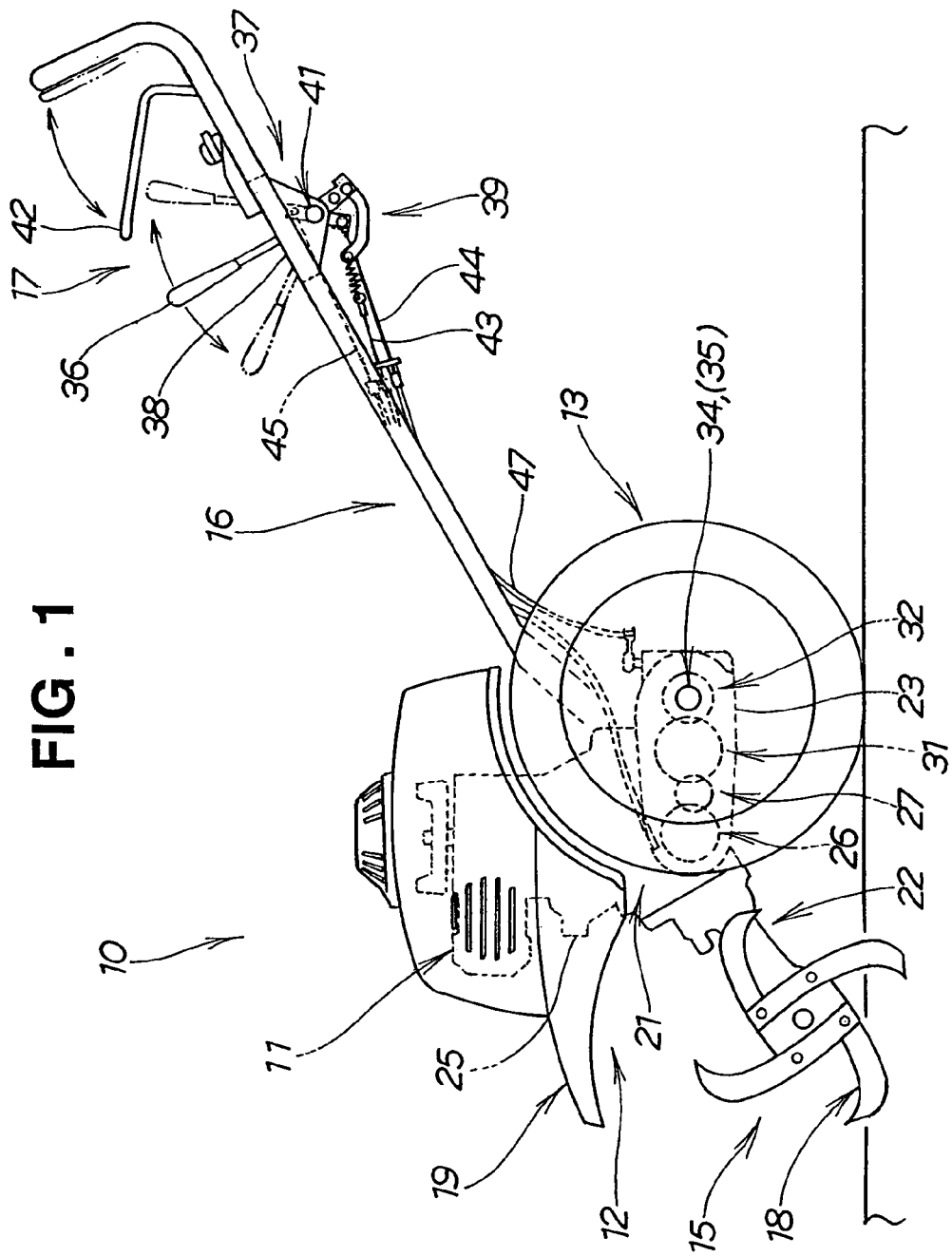
FIG. 1 is a side view of an agricultural working machine employing a differential device in accordance with an embodiment of the present invention.

Initial reference is made to FIG. 1 showing in side elevation an agricultural working machine employing a differential device 32 in accordance with an embodiment of the present invention.

In the agricultural working machine 10, driving power produced by an engine 11 as a drive source is transmitted, via a power transmission device 12, not only to left and right wheels 13 and 14 (see FIG. 2) but also to a rotary cultivating device 15 disposed in front of the wheels 13 and 14. The human operator of the machine 10 can cultivate earth by means of cultivating claws 18 of the rotary cultivating device 15 by manipulating an operation mechanism 17 on an operating handle unit 16 extending rearwardly from a rear portion of the power transmission device 12. Fender 19 covers an upper portion of the rotary cultivating device 15.

The power transmission device 12 includes a traveling speed variation mechanism 21 and a working speed reduction mechanism 22. Reference numeral 23 represents a transmission case.

The traveling speed variation mechanism 21 includes a clutch 25 oriented in a direction from the engine 11, located at an uppermost stream end of the power transmission system, toward the wheels 13 located at a lowermost stream end of the power transmission system. The traveling speed variation mechanism 21 also includes a branch section 26, a main speed regulator or changer 31, an auxiliary speed changer 27, and the differential device 32. Reference numerals 34 and 35 represent left and right drive shafts of the differential device 32 (see FIG. 2).

The operation mechanism 17, provided on the operating handle unit 16, includes an operation lever 36, a lever support mechanism 37, an operation panel 38, a pivot section 39, an rotation shaft 41, and a clutch lever 42. Reference numeral 43 represents a wire for pulling a working clutch 105 (FIG. 5) of the working speed reduction mechanism 22, 44 a wire for pulling a speed reducer 108 (FIG. 6) of the auxiliary speed changer 27, 45 a wire for pulling a speed increaser 107 (FIG. 6) of the auxiliary speed changer 27, 46 a wire of the main speed changer 31, and 47 a wire of the differential device 32.

Figure 2:
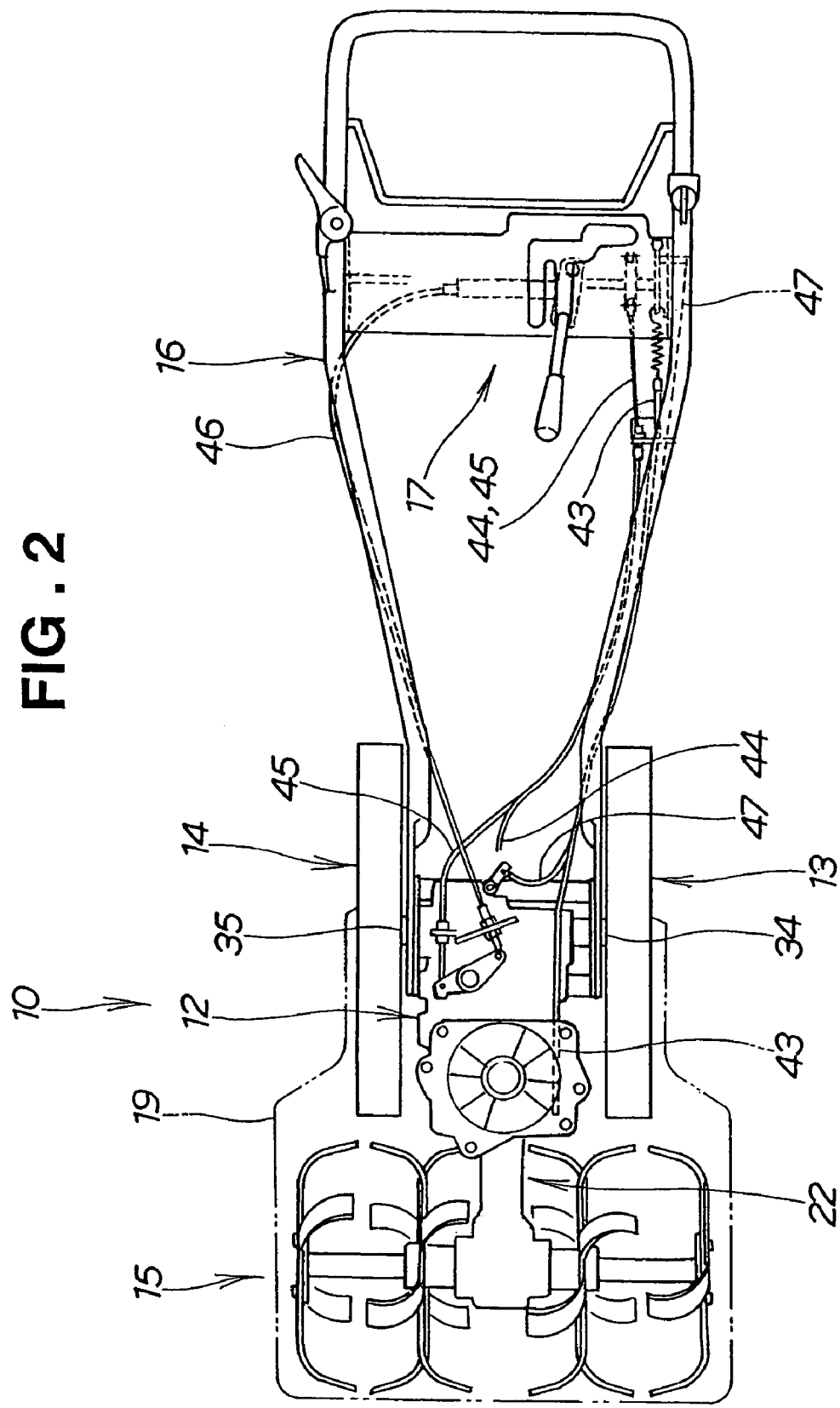
FIG. 2 is a plan view of the agricultural working machine of FIG. 1.

FIG. 2 is a top plan view showing the agricultural working machine, employing the differential device 32 of the invention, with the upper fender 19 of the rotary cultivating device 15 taken away for clarity of illustration. More specifically, in the figure, there are shown the power transmission device 12, the wheels 13 and 14 rotatably mounted on a rear portion of the power transmission device 12 via the left and right drive shafts 34 and 35, the working speed reduction mechanism 22 connected with the rotary cultivating device 15, the operation mechanism 17 mounted on the operating handle unit 16, the wire 43 of the working clutch 105, the wires 45 and 44 of the speed increaser and reducer 107 and 108, the wire 46 of the main speed changer 31, and the wire 47 of the differential device 32.

Figure 3:
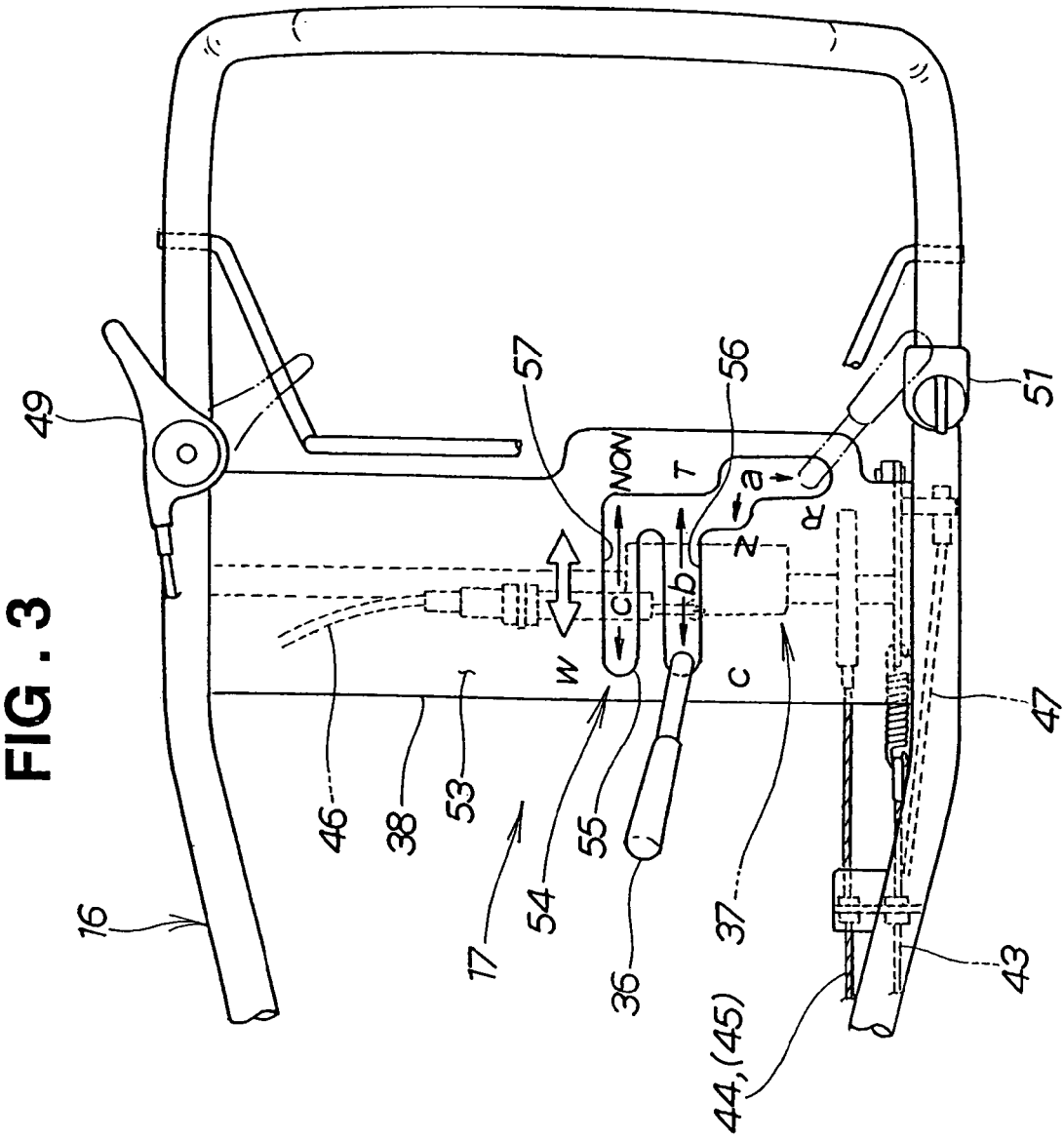
FIG. 3 is a plan view of an operation mechanism for manipulating the differential device of the present invention.

FIG. 3 is a top plan view of the operation mechanism 17 for manipulating the differential device 32 of the present invention, which particularly shows principal components of the mechanism 17, such as the operation lever 36, an operation panel 38, a throttle lever 49 mounted on a right-hand section of the operating handle unit 16 for adjusting an output of the engine 11 (FIG. 1) and an engine switch 51 mounted on a left-hand section of the operating handle unit 16 for deactivating the engine 11.

The operation lever 36 is shiftable by the human operator among a plurality of positions in order to select and set any desired one of predetermined operational conditions; specifically, the human operator can grip the operation lever 36 with one hand to shift the lever 36 to one of the positions which corresponds to the desired operational condition.

In the illustrated example, the operation lever 36 is shiftable among six positions corresponding to six operational conditions: "R" (abbreviation for "reverse") position; "N" (abbreviation for "neutral") position; "C" (abbreviation for "cultivating") position; "T" (abbreviation for "turning") position; "W" (abbreviation for "weeding") position; and "NON" (abbreviation for "non-work") position. The "R" position is an operational position for causing the machine 10 to travel via a back gear 118 (FIG. 5), the "N" position an operational position for cutting off the power transmission between the engine 11 and the drive system of the machine 10, the "C" position an operational position for causing the machine 10 to cultivate or till the earth, and the "T" position an operational position for causing the machine 10 to make a turn. Further, the "W" position is an operational position for causing the machine 10 to perform weeding work, work to cultivate the earth shallowly or the like with the cultivating claws of the rotary cultivating device set to a smaller number of rotations than in the cultivating work, and the "NON" position an operational position for causing the machine 10 to not perform the cultivating or any other particular work, for example, during mere travel of the agricultural working machine 10.

The operation panel 38 covers the lever support mechanism 37 and includes a shift gate 54 formed in a flat plate-shaped body 53 for allowing the human operator to manipulate the operation lever 36.

The shift gate 54 is in the form of a substantially F-shaped opening 55 through which the operation lever 36 projects outwardly, and the opening 55 has a first opening portion 56 extending linearly from the "C" (cultivating) position to the "T" (turning) position and a second opening portion 57 extending linearly from the "W" (weeding) position to the "NON" (non-work) position in adjacent parallel relation to the first opening portion 56.

Operation for shifting the operation lever 36 between the "N" and "R" positions is performed in a manner as depicted by arrow a in FIG. 3. Operation for shifting the operation lever 36 between the "C" (cultivating) and "T" (turning) positions is performed in a manner as depicted by arrow b, and operation for shifting the operation lever 36 between the "W" (weeding) and "NON" (non-work) positions is performed in a manner as depicted by arrow c.

Figure 4:
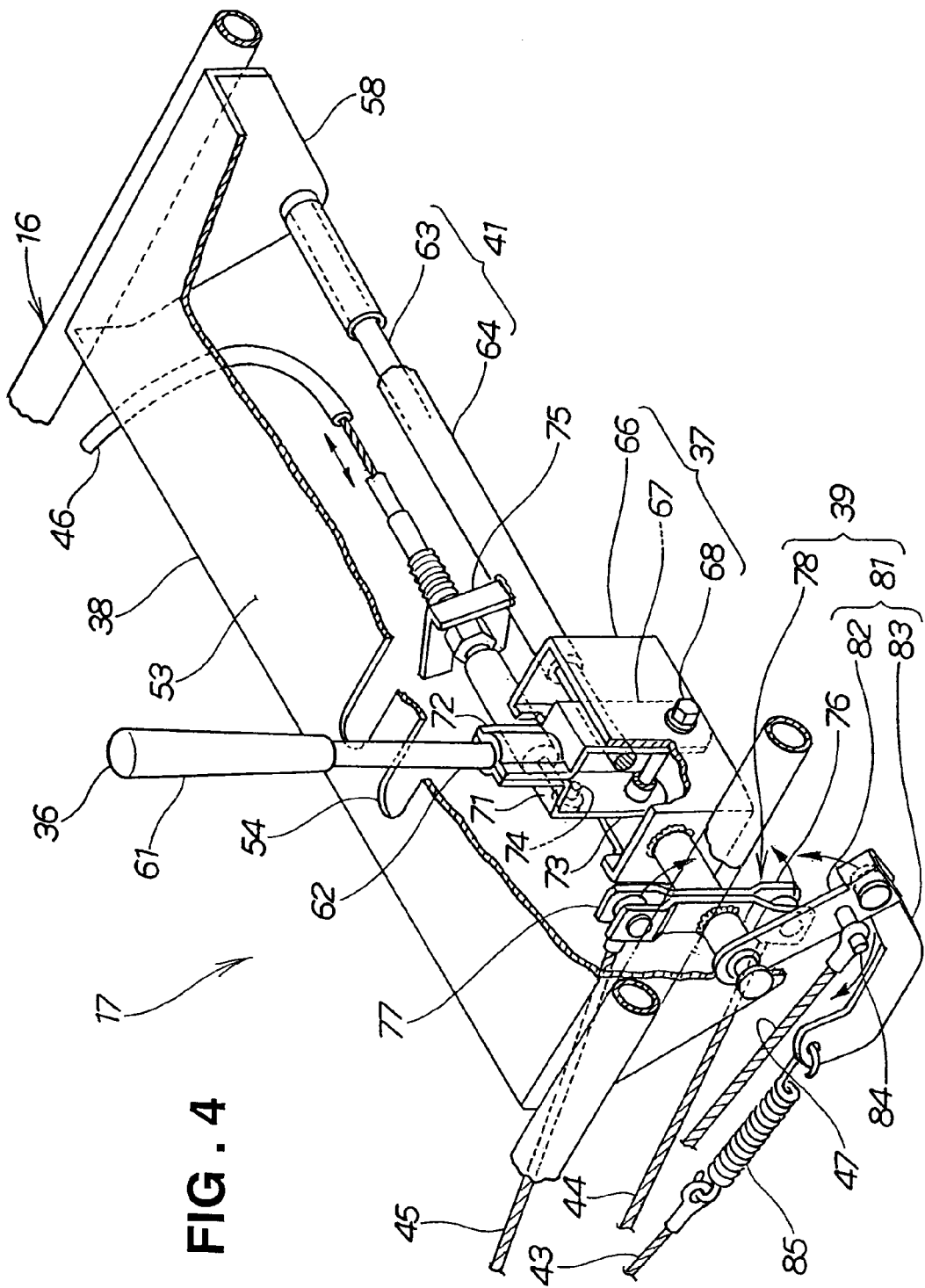
FIG. 4 is a perspective view of the operation mechanism for manipulating the differential device of the present invention.

FIG. 4 is a perspective view of the operation mechanism 17 for manipulating the differential device 32 of the present invention.

The operation mechanism 17 includes the operation panel 38 secured to the operating handle unit 16, the rotation shaft 41 secured to lugs 58 provided on opposite ends of the operation panel 38, the pivot section 39 and lever support mechanism 37 mounted on the rotation shaft 41, and the operation lever 36 partly fitted in the lever support mechanism 37.

The operation lever 36 includes a grip 61 formed at its one end portion, and a base 62 at its other end portion. The rotation shaft 41 has a fixed shaft portion 63 secured at its opposite ends to the lugs 58, and a rotatable tube 64 rotatably threaded over the fixed shaft portion 63.

The lever support mechanism 37 includes a first member 66 of a box shape mounted on the rotatable tube 64 for pivotal movement in a front-and-rear direction of the working machine 10, and a second pivotable member 67 of an inverted U-shape mounted via a bolt 68 in the first member 66 for pivotal movement in a left-and-right direction of the working machine 10. The lever support mechanism 37 not only supports the base 62 of the operation lever 36 in such a manner that the operation lever 36 is shiftable among the above-mentioned six positions, but also delivers an operating force from the human operator to the power transmission device 12 (FIG. 1).

The second pivotable member 67, pivotable in the left-and-right direction, has a fitting portion 72 formed on its first wall section 71 for fitting therein a lower end portion of the operation lever 36, and a retaining portion 74 formed on its second wall section 73 for retaining one end of the wire 46 of the main speed changer 31 (FIG. 1). Reference numeral 75 represents a lug mounted on a substantial middle portion of the rotatable tube 64, and this lug 75 is pivotable in the front-and-rear direction of the machine 10 together with the lever support mechanism 37 while holding the wire 46 of the main speed changer 31.

The pivot section 39, which is secured at its central portion to the rotatable tube 64 near the lever support mechanism 37, includes an arm member 78 having one end 76 retaining one end of the wire 44 of the speed reducer 108 and another end 77 retaining one end of the wire 45 of the speed increaser 107. The pivot section 39 also includes a link 81 retaining one end of the wire 43 of the working clutch.

The link 81 includes a fixed arm portion 82 having one end welded to the rotatable tube 64, and a pivotable arm portion 83 pivotally connected to the other end of the fixed arm portion 82. Reference numeral 84 represents a retainer member secured to the link 81 and retaining one end of the wire 47 of the differential device 32, and 85 a tension spring.

Namely, the pivot section 39 retains the respective one ends of the wire 43 of the working clutch, wires 44 and 45 of the speed reducer and increaser 108 and 107, wire 46 of the main speed changer 31 and wire 47 of the differential device 32. Thus, one pivotal movement of the pivot section 39 can simultaneously push or pull these five wires 43–47 to simultaneously activate the respective components of the power transmission device 12 to be described hereinbelow.

Figure 5:
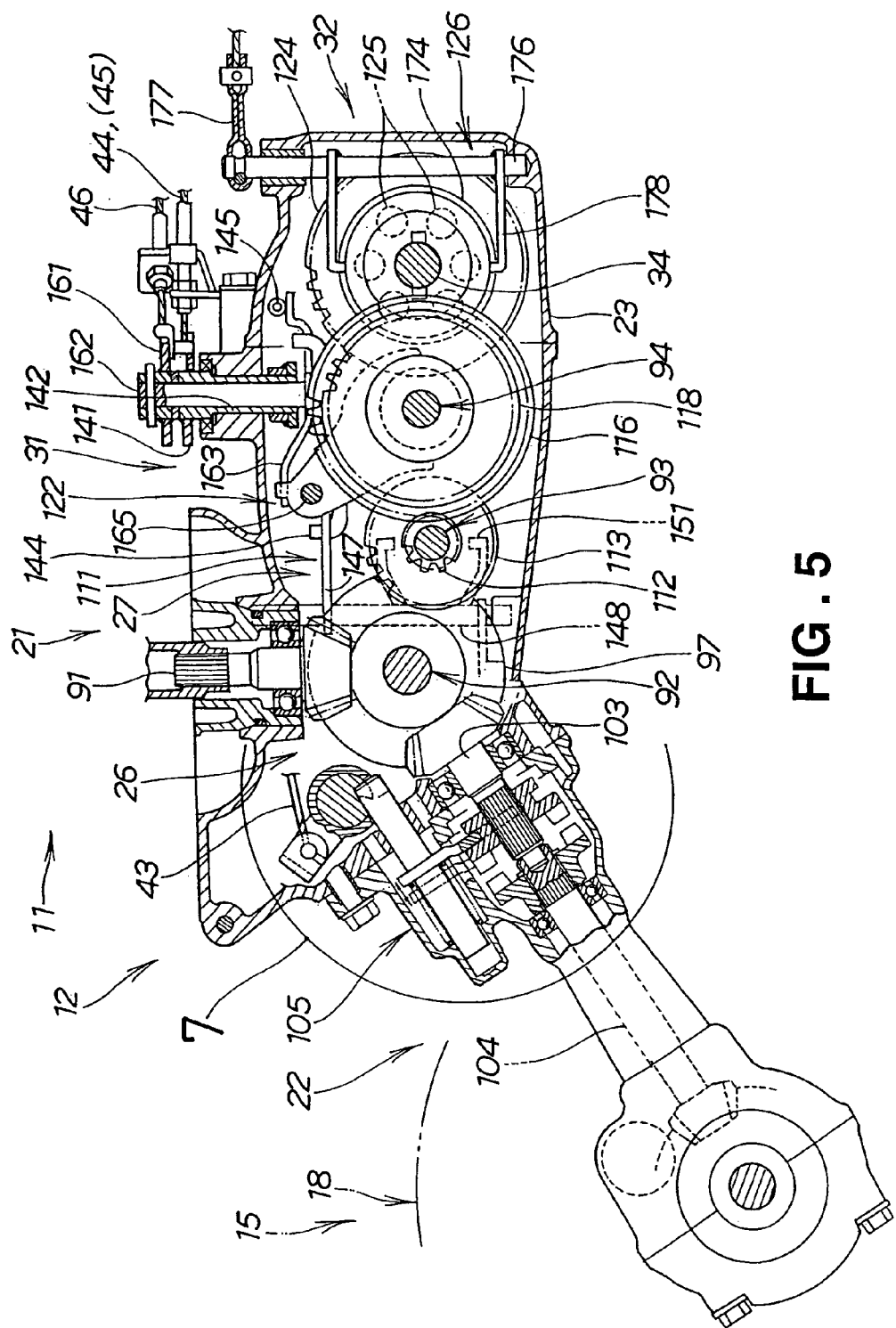
FIG. 5 is a sectional view of a power transmission device provided with the differential device of the present invention.

FIG. 5 is a sectional view of the power transmission device 12 employing the differential device 32 of the present invention.

As noted above, the power transmission device 12 includes the branch section 26, auxiliary speed changer 27, main speed changer 31, differential device 32 and working speed reduction mechanism 22 connected to the branch section 26, which are positioned sequentially in a direction from the engine 11 toward the wheels. The power transmission device 12 also includes a first main shaft 91, a second main shaft 92, a third main shaft 93 and a drive shaft 94, which are also positioned sequentially in the above-mentioned direction. Thus, the power transmission device 12 transmits the engine power from the first main shaft 91 to the left and right drive shafts 34 and 35 (FIG. 6) via gears provided on the above-mentioned shafts.

The branch section 26 includes the second main shaft 92, a bevel gear 97, and low and high gears 98 and 101 (FIG. 6), which are all provided on the second main shaft 92.

The working speed reduction mechanism 22 includes a first shaft 103 connected via a bevel gear to the branch section 26, a second shaft 104 disposed adjacent to the rotary cultivating device 15, and the working clutch 105 having one end connected to the first shaft 103 and the other end connected to the second shaft 104. The working clutch 105 starts and stops rotating operation of the cultivating device 15. Details of the working clutch 105 will be described below with reference to FIG. 7.

The auxiliary speed changer 27 includes the third main shaft 93, the speed increaser 107 and speed reducer 108 (FIG. 6) provided on the third main shaft 93, the auxiliary speed-varying shift mechanism 111 for fixing the speed increaser 107 or speed reducer 108 to the third main shaft 93, a first auxiliary drive gear 112 provided on the third main shaft 93, a second auxiliary drive gear 113 provided on the third main shaft 93, and the wires 44 and 45 (FIG. 2) retained at their respective ends by the auxiliary speed-varying shift mechanism 111. The auxiliary speed-varying shift mechanism 111 will be described with reference to FIG. 8.

The main speed changer 31 includes the drive shaft 94, a single-speed driven gear 116 and double-speed driven gear 117 (FIG. 6) provided on the drive shaft 94, the back gear 118 counter-rotatable via a not-shown gear, a neutral section 119 (FIG. 6), a drive gear 121 (FIG. 6), and a shift mechanism 122 for fixing any one of the single-speed and double-speed driven gears 116, 117 and back gear 118 to the drive shaft 94. The shift mechanism 122 will be described with reference to FIG. 9.

The differential device 32 transmits power, received via a driven gear 124 rotatable by the engine, to the left and right drive shafts 34 and 35, via a plurality of ball members 125, to thereby allow the wheels to be driven in a differential manner (differential operation mode) via a lock/release (actuator) member 126 as necessary. For example, the driven gear 124 is a spur gear. Namely, the member 126 is provided for shifting the differential device 32 between a non-differential operation mode and a differential operation mode, as will be later described.

Figure 6:
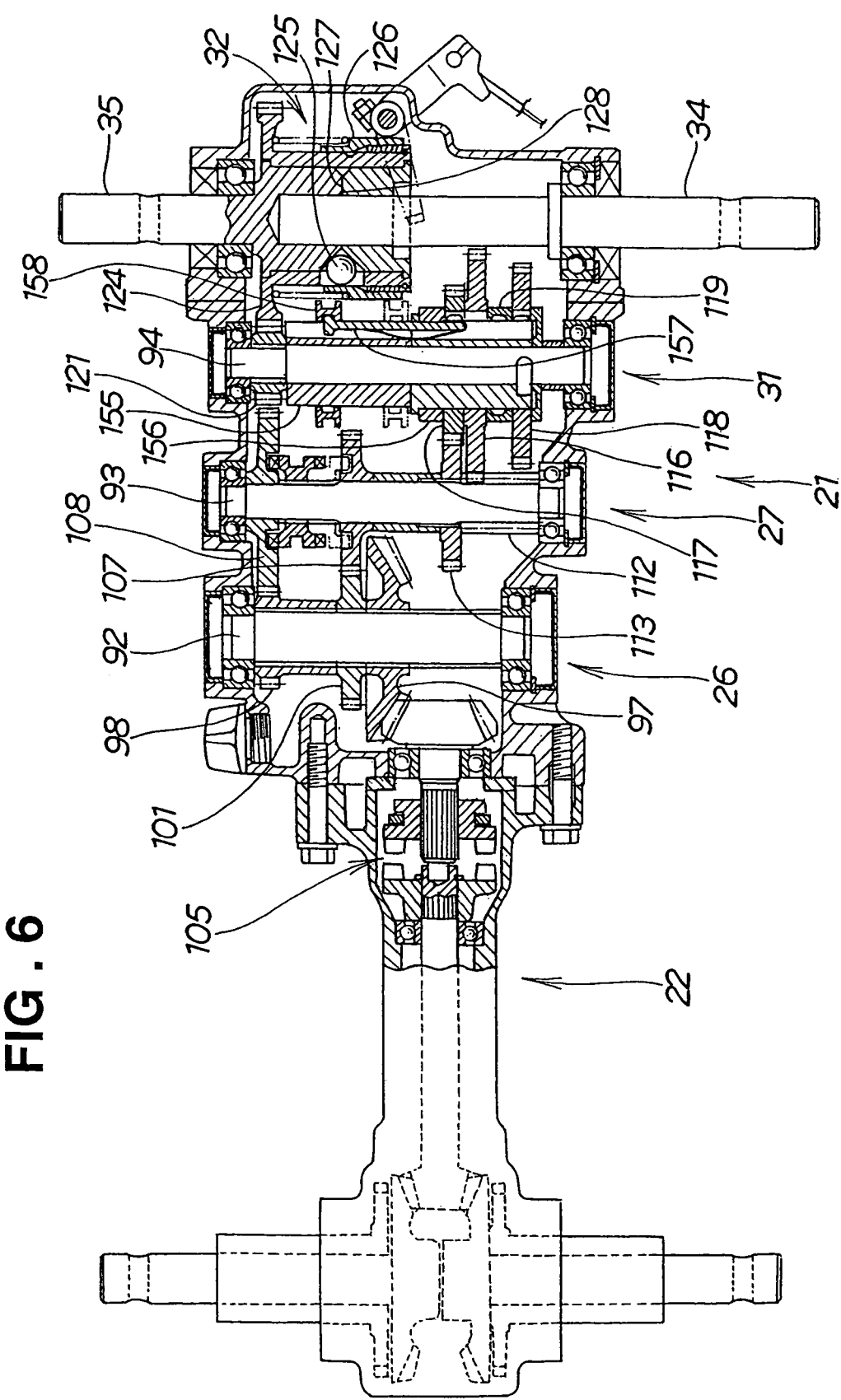
FIG. 6 is another sectional view of the power transmission device provided with the differential device of the present invention.

FIG. 6 is another sectional view of the power transmission device 12 employing the differential device 32 of the present invention, which particularly shows exemplary arrangement of the second and third main shafts 92, 93 and drive shaft 94 in development. FIG. 6 also shows the branch section 26, the speed increaser 107 and speed reducer 108 of the auxiliary speed changer 27, the main speed changer 31, the differential device 32, and the working speed reduction mechanism 22 connected to the branch section 26.

The speed increaser 107 is a high gear for high-speed rotation, which is, for example, a spur gear. The spur gear used as the speed increaser 107 has a recessed portion formed in its side surface and fittingly engaging with the auxiliary speed-varying shift mechanism 111.

The following paragraphs briefly explain relationship between the power transmission device 12 and the operation mechanism 17 (FIG. 3).

When the operation lever 36 is at the "C" (cultivating) position, the agricultural working machine travels via the speed reducer (low gear) 108 and single-speed driven gear 116 with the working clutch 105 placed in a connecting position and the differential device 32 placed in a non-differential operating state.

When the operation lever 36 is at the "T" (turning) position, the agricultural working machine travels via the speed increaser (high gear) 107 and single-speed driven gear (low gear) 116 with the differential device 32 placed in a differential operating state.

When the operation lever 36 is at the "W" (weeding) position, the agricultural working machine travels via the speed reducer (low gear) 108 and double-speed driven gear 117 with the working clutch 105 placed in the connecting state and the differential device 32 placed in the non-differential operating state.

When the operation lever 36 is at the "NON" (non-work) position, the machine travels via the speed increaser (high gear) 107 and double-speed driven gear (second gear) 117 with the differential device 32 placed in the differential operating state.

The differential device 32 includes the ball members 125 disposed between an axial extension of the driven gear 124 rotatable by the engine, an end 127 of the left drive shaft 34 and an end 128 of the right drive shaft 35. The ball members 125 are provided in spaced-apart relation to each other along a circumferential direction of the axial end portions of the left and right drive shafts 34 and 35. The differential device 32 causes, as necessary, the left and right drive shafts 34 and 35 to rotate differentially via the driven gear 124. Details of the differential device 32 will be discussed later.

Figure 7:
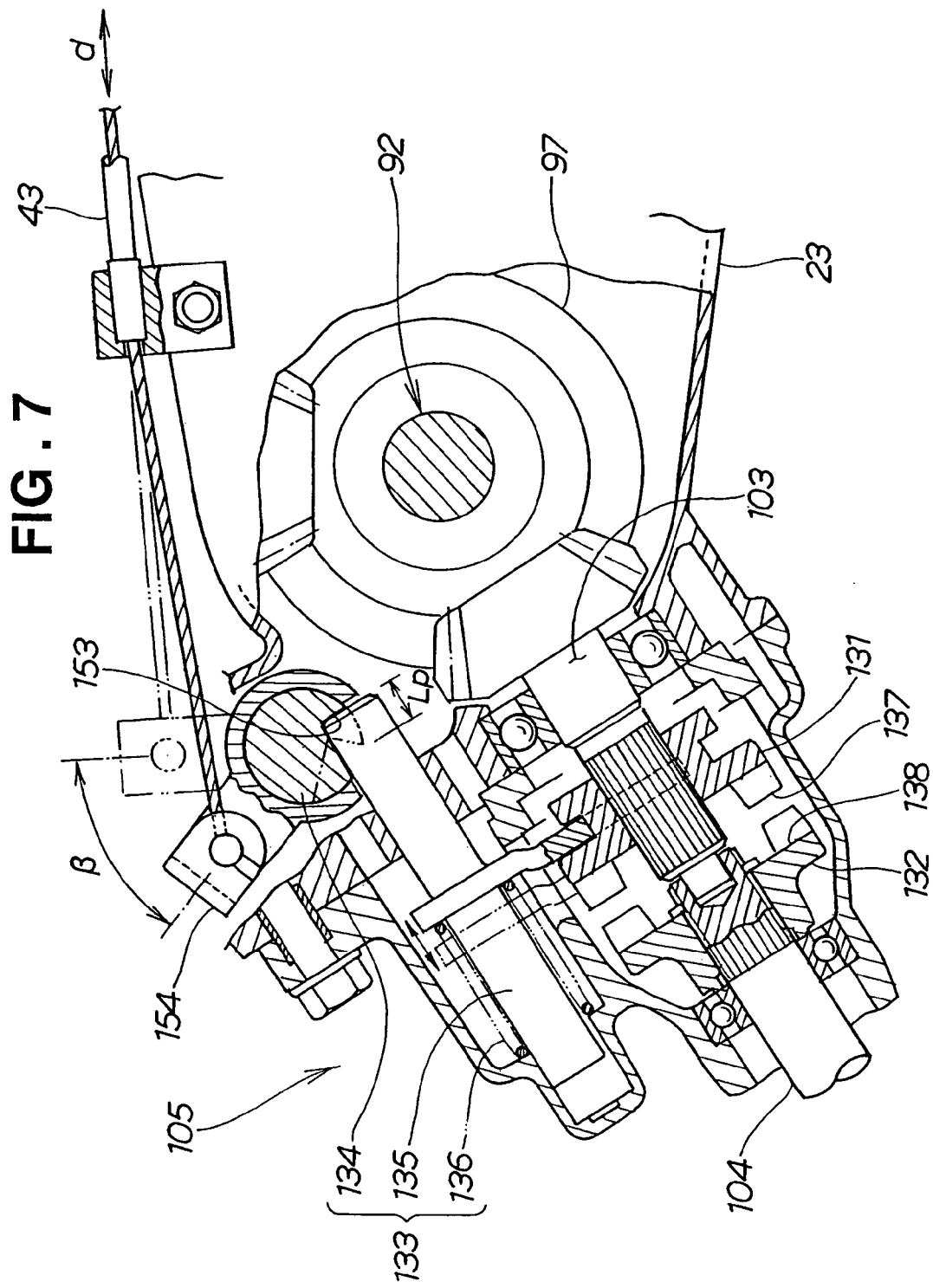
FIG. 7 is an enlarged detailed view of a section represented at "7" of FIG. 5.

FIG. 7 is an enlarged detailed view of a section depicted at "7" of FIG. 5, which particularly shows the working clutch 105 in a disconnecting position to cut off the power transmission.

The working clutch 105 includes a first connecting/disconnecting ring 131 movably provided on the first shaft 103 via a spline connection, a second connecting/disconnecting ring 132 movably provided on the second shaft 104 via a spline connection, a slide section 133 provided for moving the first connecting/disconnecting ring 131 and having a rotating/pushing shaft 134, a moving shaft 135 and a compression spring 136, and the above-mentioned wire 43. As the rotating/pushing shaft 134 is rotated through an angle β, as depicted by imaginary lines, by a force (in a direction of arrow d) of the wire 43, the moving shaft 135 moves a distance Lp so that a projected portion 137 of the first connecting/disconnecting ring 131 and a recessed portion 138 of the second connecting/disconnecting ring 132 are brought into engagement with each other to permit the power transmission. When the power transmission is to be cut off, the above-mentioned operations are reversed, via operation of the operation lever 36 and compression spring 136, to bring the components back to their positions as depicted by solid lines, and thus the working clutch 105 is placed in the disconnecting position.

Figure 8:
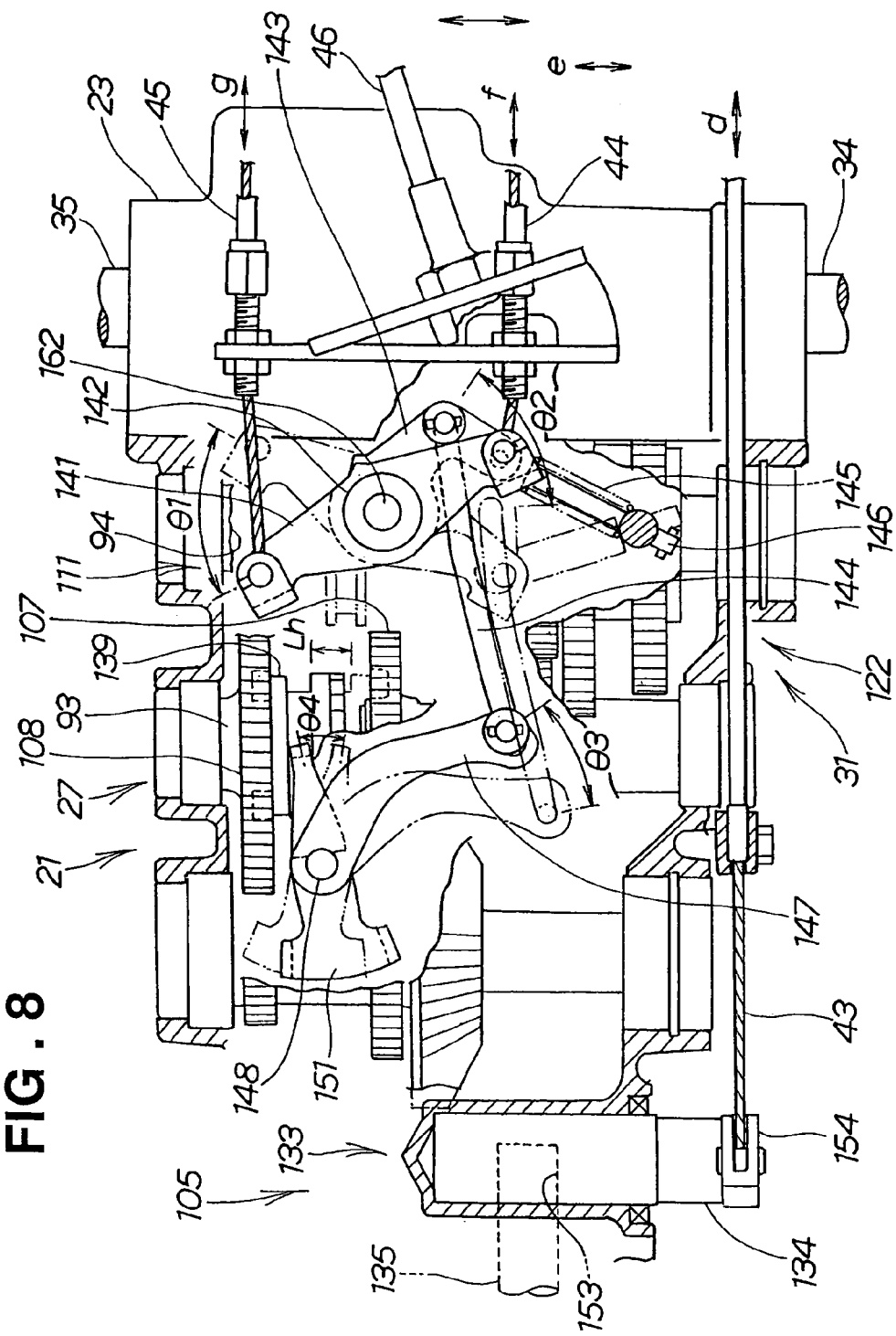
FIG. 8 is a plan view of an auxiliary speed-varying shift mechanism for transmitting power to the differential device of the present invention.

FIG. 8 is a plan view of the auxiliary speed-varying shift mechanism 111 for transmitting the power to the differential device 32 of the present invention, which particularly shows a state in which the speed reducer 108 is selected via the auxiliary speed changer 27 and auxiliary speed-varying shift mechanism 111.

The auxiliary speed-varying shift mechanism 111 includes a shift ring 139 fitted over the third main shaft 93 for sliding movement in a direction of arrow e, and a yoke-shaped first pivot arm 141 located outside (i.e., adjacent to one outer side surface of) the transmission case 23. Tubular member 142 (see FIG. 5) is connected at one end to the center of the first pivot arm 141 and pivotably passed through the transmission case 23, an L-shaped second pivot arm 143 is connected at one end to the other end of the tubular member 142 adjacent to the other outer side surface of the transmission case 23, and a rod 144 is connected at one end to the center of the second pivot arm 143. Further, a compression spring 145 is pivotably secured at one end to the other end of the second pivot arm 143 via a mounting member 146, and a dogleg-shaped third pivot arm 147 (see FIG. 5) is connected at one end to the other end of the rod 144. Furthermore, a shaft member 148 (see FIG. 5) is secured to the other end of the third pivot arm 147, opposite ends of the shaft member 148 are pivotably fitted in inner surfaces of the transmission case 23, a C-shaped shift arm 151 (see also FIG. 5) is secured at its center to the middle of the shaft member 148, and an outer peripheral recessed portion of the shift ring 139 is engaged with opposite ends of the shift arm 151. The shift ring 139 is actuated by forces of the wires 44 and 45 acting in directions of arrow f and arrow g.

Referring now to FIG. 4 as well as FIG. 8, as the first pivot arm 141 pivots through an angle θ1 in the auxiliary speed-varying shift mechanism 111, the second pivot arm 143 within the transmission case 23 pivots through an angle θ2, and simultaneously the third pivot arm 147 pivots through an angle θ3 via the rod 144. Thus, the shift arm 151 pivots through an angle θ4 to shift the shift ring 139 over a distance Lh as depicted by an imaginary line. As a consequence, the main shaft 93 transmits, to the drive shaft 94 via the speed increaser (high gear) 107, a number of rotations greater than that of the speed reducer (low gear) 108.

FIG. 8 also shows the slide section 133 of the working clutch 105. The slide section 133 has a recess 153 formed centrally in the rotating/pushing shaft 134 that is rotatably fitted in the transmission case 23 with the recess 153 positioned at one end of the moving shaft 135 and with one end of the rotating/pushing shaft 134 positioned outside the transmission case 23. Retainer 154 is provided at the one end of the rotating/pushing shaft 134 for retaining the end of the wire 43, so that the rotating/pushing shaft 134 can be turned, by the force of the wire 43 acting in the direction of arrow d, to move the moving shaft 135 and thereby place the working clutch 105 in the connecting state.

During that time, the speed reducer (low gear) 108 is automatically selected via simultaneous operation of the operation mechanism 17 (see FIG. 3) and shift arm 151 of the auxiliary speed-varying shift mechanism 111. On the other hand, either the single-speed mode or the double-speed mode is selected via the shift mechanism 122 of the main speed changer 31.

The following paragraphs describe the shift mechanism 122 for selecting the single-speed or double-speed means.

Figure 9:
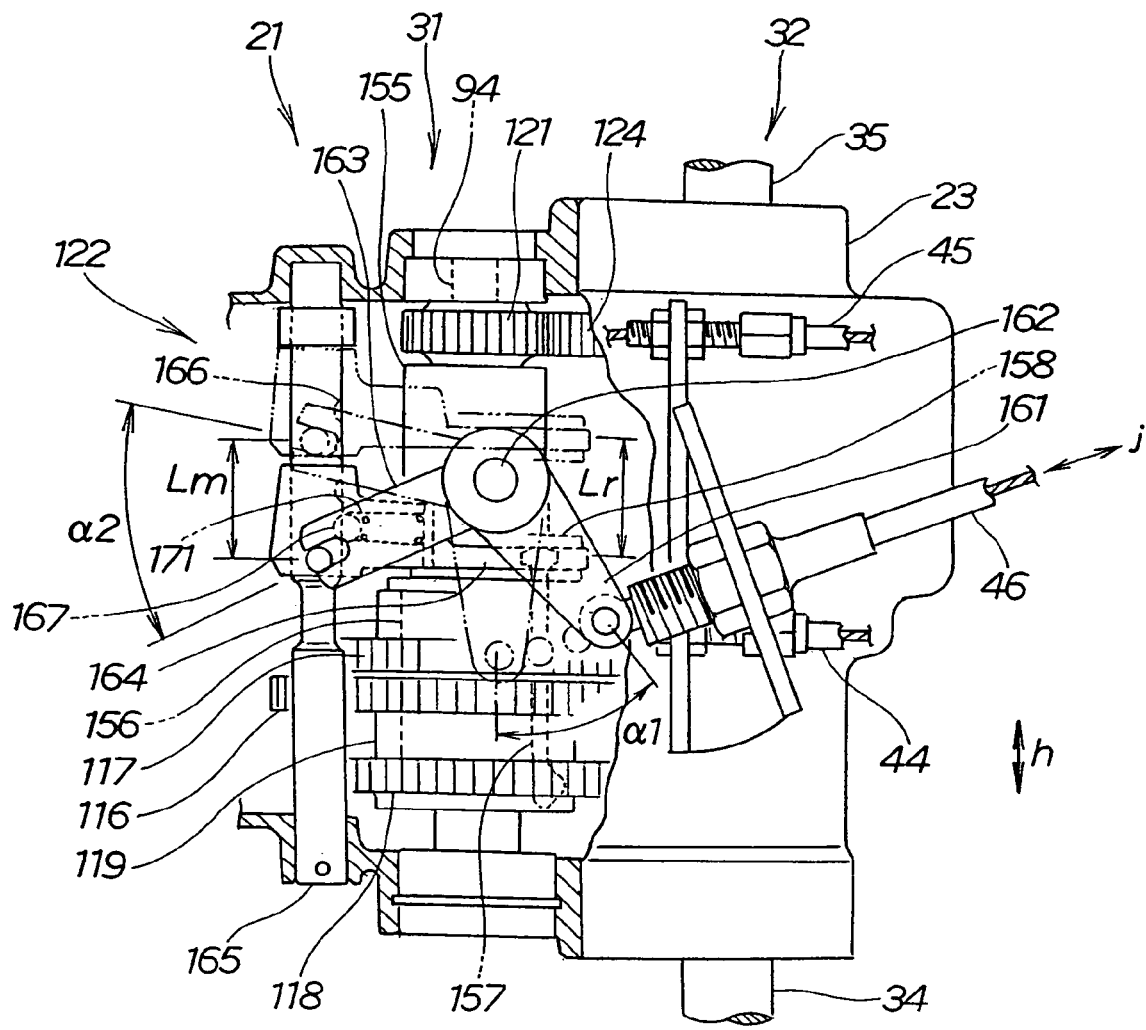
FIG. 9 is a plan view of a shift mechanism for transmitting power to the differential device of the present invention.

FIG. 9 is a plan view of the shift mechanism 122 for transmitting the power to the differential device 32 of the present invention, which particularly shows the main speed changer 31 of the traveling speed variation mechanism 21 and the single-speed and double-speed driven gears 116 and 117.

The shift mechanism 122 includes first and second guiding tubular members 155 and 156 fitted over the drive shaft 94, a sliding key member 157 is fitted in grooves formed longitudinally in the guiding tubular members 155 and 156 for sliding movement therein in a direction of arrow h, and an H-shaped ring 158 (having an "H" sectional shape) is fitted in an outer peripheral surface of the first guiding tubular member 155 for sliding movement therein in the direction of arrow h. Further, an elliptical coupling plate 161 is disposed outside the transmission case 23, a coupling shaft 162 (see FIG. 5) is connected at one end to a base portion of the coupling plate 161, and the coupling shaft 162 is pivotably passed, via the tubular member 142 (see FIG. 5), through the transmission case 23. Further, a lever 163 is fixedly connected to the other end of the coupling shaft 162, a projected portion of a shift fork 164 is engaged in a recessed portion formed at a distal end of the lever 163, and an annular groove portion of the H-shaped ring 158 is fitted around the distal end of the shift fork 164. Thus, the shift fork 164 is operated by the force of the wire 46 acting in a direction of arrow j.

The shift fork 164 includes a guide pin 165 secured to the transmission case 23 and having four shifting recessed portions 166. The shift fork 164 also includes a shift ball 167 accommodated therein, and a spring 171 pressing the shift ball 167 against any one of the shifting recessed portions 166.

The shifting recessed portions 166 are set as "R" (reverse), "N" (neutral), "single-speed" and "double-speed" portions, respectively. In the illustrated example of FIG. 9, the shift ball 167 is shown as fitted in the "R" portion, and the sliding key member 157 is shown as fitted in the back gear 118.

Operation of the shift mechanism 122 when a shift is to be made from the "R" portion to the double-speed (non-work) position is described below with reference to FIGS. 4, 6 and 9.

Namely, as the coupling plate 161 is turned through an angle α1 by the force of the wire 46 acting in the direction of arrow j, the lever 163 within the transmission case 23 pivots through an angle α2, so that the shift fork 164 is moved a distance Lm as depicted by a two-dot chain line so as to shift the H-shaped ring 158 over a distance Lr as also depicted by a two-dot chain line (Lr=Lm). In response to such a shift, a cam formed on the sliding key member 157 fits in an inner peripheral recessed portion of the double-speed driven gear 117 to thereby fix the driven gear 117 to the drive shaft 94. As a consequence, the drive shaft 94 is rotated, via the double-speed driven gear 117, at an increased rate (i.e., with an increased number of rotations) and thereby delivers the power to the driven gear 124 of the differential device 32 via the drive gear 121.

Figure 10:
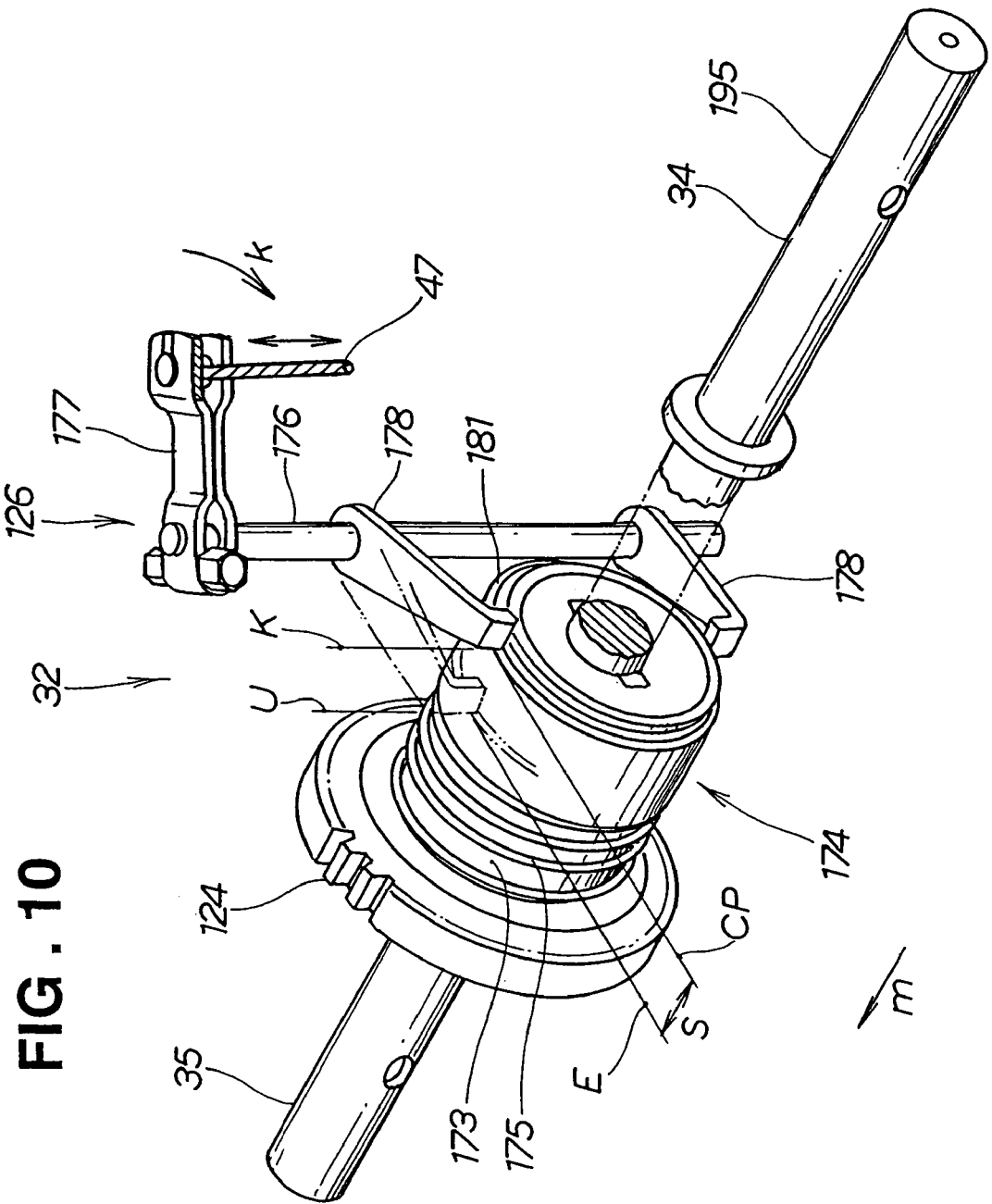
FIG. 10 is a perspective view of the differential device of the present invention.

FIG. 10 is a perspective view of the differential device 32 of the present invention.

Specifically, the differential device 32 includes the driven gear (rotational member) 124, the left and right drive shafts 34 and 35, the lock/release member 126, a ball retaining member 173 as the extension of the rotational member 124, a shift member 174 and a compression spring 175. As the lock/release member 126 is moved, as depicted by arrow k, by the force of the wire 47, the differential device 32 makes pivoting movement as depicted by a two-dot chain line to thereby permit differential operation of the left and right wheels. In the figure, reference character CP represents a ball-restricting position of the shift member 174, E a ball-releasing position of the shift member 174, S a sliding distance of the shift member 174, K a locking position of the lock/release member 126, and U a lock releasing position of the lock/release member 126.

The lock/release member 126 has a shaft member 176 rotatably provided upright within the transmission case 23 (see FIG. 5). Wire retaining arm 177 is connected to one end of the shaft member 176 located outside the transmission case 23, opposed release arms 178 are fixedly provided on an intermediate portion of the shaft member 176, and the release arms 178 have respective distal ends abutting against an end surface 181 of the shift member 174. The shift member 174 is sled, in a direction of arrow m, from the restricting position C to the releasing position E.

Figure 11:
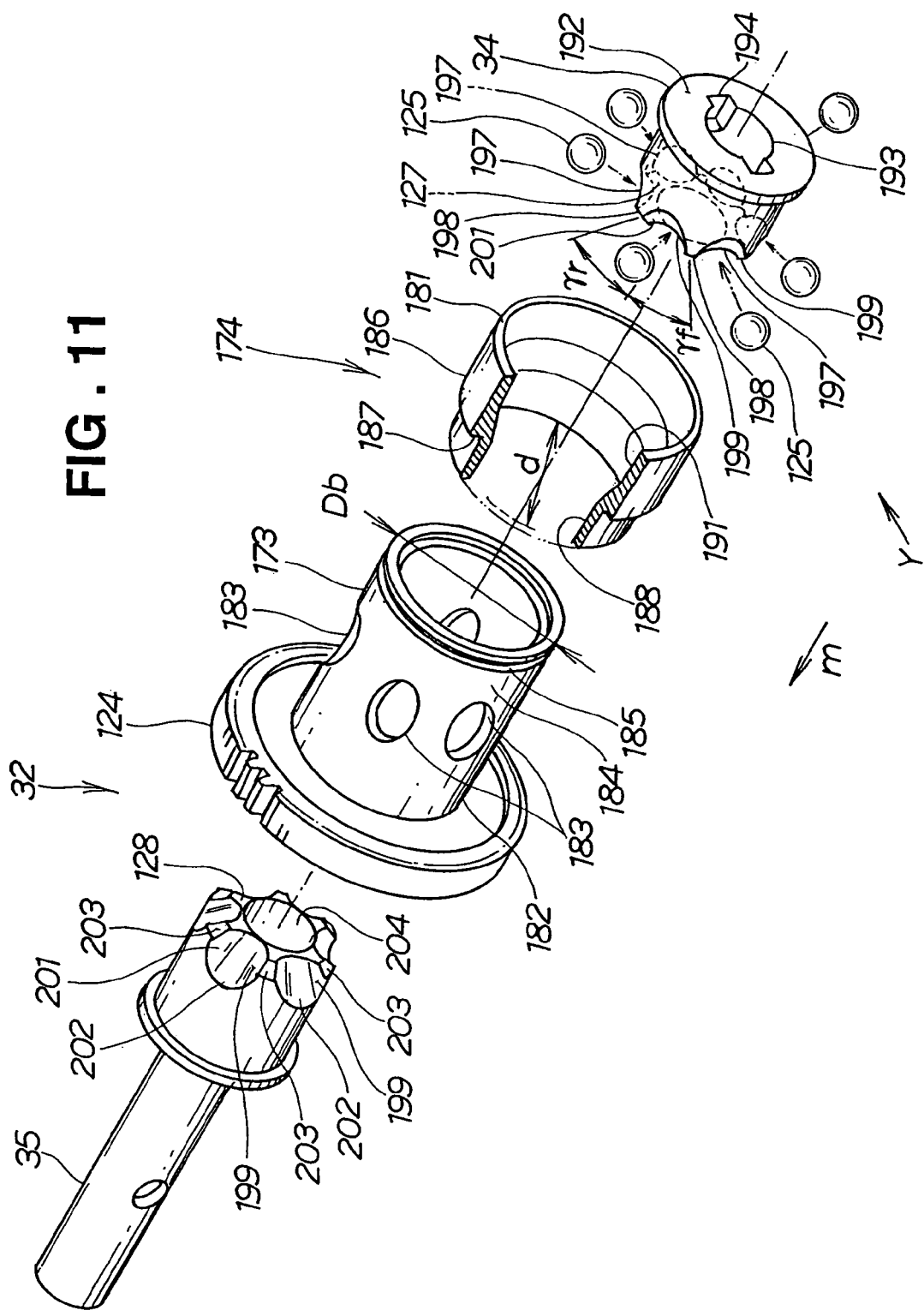
FIG. 11 is an exploded perspective view of the differential device of the present invention.

FIG. 11 is an exploded perspective view of the differential device 32 of the present invention, which particularly shows the ball retaining member 173, shift member 174 and left and right drive shafts 34 and 35.

The ball retaining member 173 includes a cylindrical body 182 formed integrally or continuously with the rotational member (driven gear) 124 to extend along opposed axial end portions of the left and right drive shafts 34 and 35 and having a plurality of (six in the illustrated example) through-hole portions 183 in a middle portion of the body 182. Each of the through-hole portions 183 receives part of a corresponding one of the ball members 125. Thus, the ball retaining member 173 rotates with the rotational member (driven gear) 124. Groove 185 is formed in an outer peripheral portion 184 of the ball retaining member 173 for preventing movement of the shift member 174. Driving power received via the driven gear 124 is transmitted to the balls 125 through the edge of the through-hole portions 183. The outer peripheral portion 184 of the cylindrical body 182 has an outer diameter Db.

The shift member 174 has a shoulder or stepped portion 187 via which a spring is fitted in an outer peripheral portion of a cylindrical body 186 thereof. The shift member 174 also has a ball-restricting portion 188 on its inner periphery, and a ball-releasing portion 191 formed integrally with the ball-restricting portion 188 to extend away from the ball retaining member 173. The ball-releasing portion 191 has an inner diameter greater than the inner diameter d of the ball-restricting portion 188. The body 186 has an outer diameter such that the distal ends of the release arms 178 (FIG. 10) of the lock/release member 126 can properly engage the end surface 181 of the shift member 174. The ball-restricting portion 188 has an inner diameter d substantially equal to the outer diameter D of the outer peripheral portion 184 of the ball retaining member 173, and the shift member 174 is slidable along the ball retaining member 173 in a direction of arrow m.

The left drive shaft 34 includes a side member 192 fitted in the ball retaining member 173, and a shaft member 195 (FIG. 10) fitted in a hole 193 and key grooves 194 of the side member 192. The side member 192 has six power-transmitting recessed portions (also referred to as power-transmitting portions) 197 formed on its outer peripheral surface near an end of the side member 192, i.e. the shaft end 127 in such a manner that the ball members 125 are caught or engaged in the respective recessed portions 197. The side member 192 also has non-power-transmitting beveled or chamfered portions (also referred to as non-power-transmitting portions) 198 formed continuously with and between the power-transmitting portions 197 in such a manner that the ball members 125 are not engaged with the non-power-transmitting portions 198 for driving power transmission.

Specifically, each of the power-transmitting recessed portions 197 has a slanted bottom surface. Specifically, each of the power-transmitting recessed portions 197 has a front contact surface 199 slanted relative to the axial centerline of the device 32 at an angle γf so that the surface 199 is pressed by the corresponding ball member 125 to receive the driving power via the ball member 125 during forward movement of the ball member 125, and a rear contact surface 201 slanted relative to the axial centerline at an angle γr (γr=γf) so that the surface 201 is pressed by the corresponding ball member 125 to receive the driving power via the ball member 125 during rearward movement of the ball member 125.

The right drive shaft 35 has six power-transmitting recessed portions (also referred to as power-transmitting portions) 202 formed on its outer peripheral surface near the shaft end 128 in such a manner that the ball members 125 are caught or engaged in the respective recessed portions 202 to effect driving power transmission, and non-power-transmitting beveled or chamfered portions (also referred to as non-power-transmitting portions) 203 formed continuously with and between the power-transmitting portions 202 in such a manner that the ball members 125 are not engaged with the non-power-transmitting portions 203 for driving power transmission. The right drive shaft 35 also has a connecting hole 204 formed therein along its axial centerline and having the shaft member 195 (see FIG. 10) of the left drive shaft 34 rotatably fitted therein. Namely, the pairs of the opposed power-transmitting portions 197 and 202 are provided in spaced-apart relation to each other along the circumferential direction of the axial end portions of the left and right drive shafts 34 and 35. The pairs of the non-power-transmitting portions 198 and 203 are formed, on the opposed axial end portions of the left and right drive shafts 34 and 35, between the pairs of the power-transmitting recessed portions 197 and 202.

Similarly to the power-transmitting portion 197 of the left drive shaft 34, each of the power-transmitting portions 202 of the right drive shaft 35 has a slanted bottom surface. Specifically, each of the power-transmitting portions 202 has a front contact surface 199 slanted at the angle γf and a rear contact surface 201 slanted at the angle γr (γr=γf). The power-transmitting portions 202 of the right drive shaft 35 correspond in position to the power-transmitting portions 197 of the left drive shaft 34, and each pair of the corresponding power-transmitting portions 202 and 197 together constitutes a ball-receiving groove of a generally "V" sectional shape, as viewed in vertical section, as seen in FIG. 12.

Figure 12:
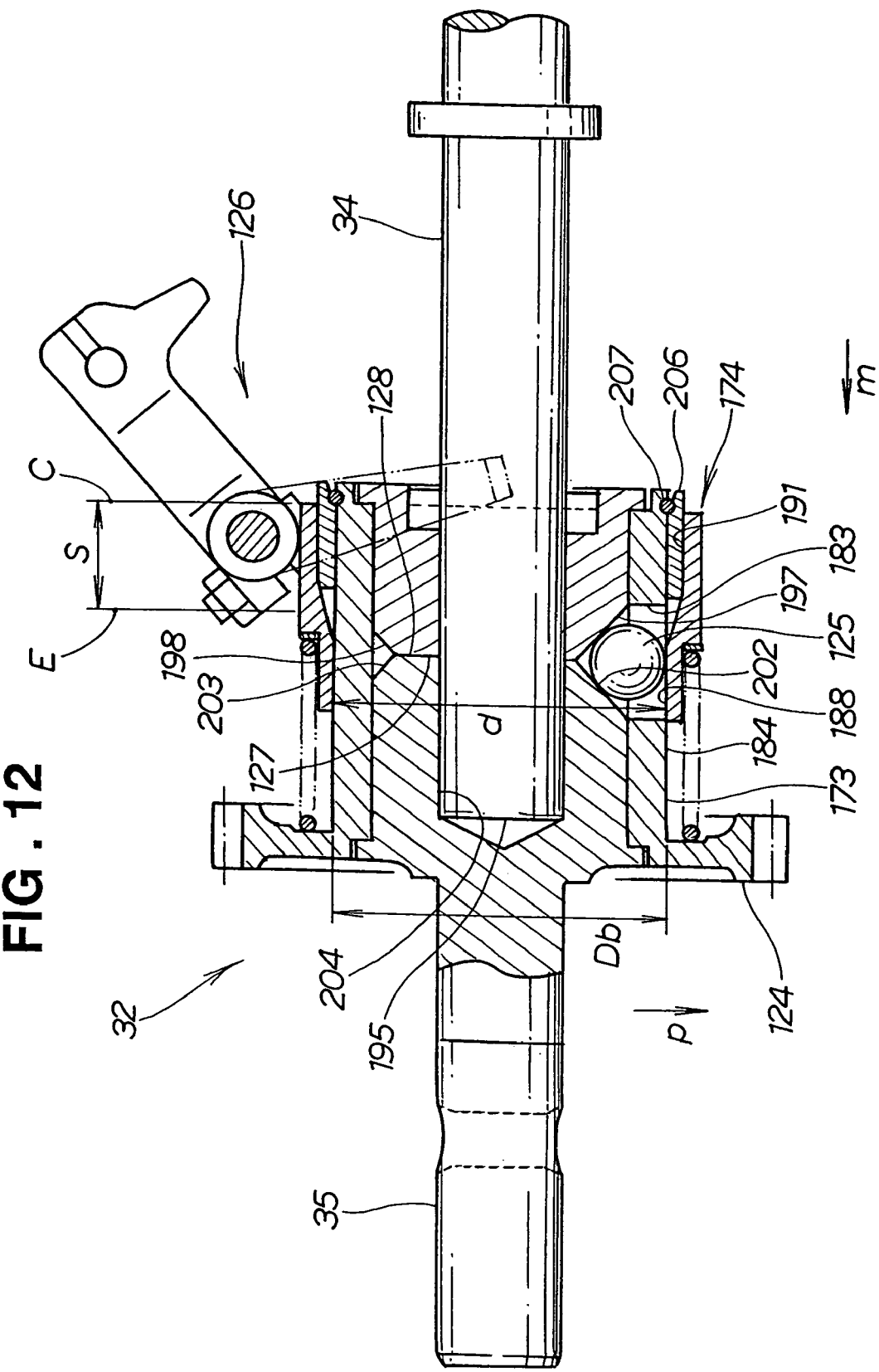
FIG. 12 is a sectional view of the differential device of the present invention.

FIG. 12 is a sectional view of the differential device 32 of the present invention. The differential device 32, as may be understood from the forgoing, comprises: the ball retaining member 173 formed integrally with the rotational member (driven gear) 124 and having the six through-hole portions 183 each receiving the ball member 125 for movement in a radial direction of the member 173 (i.e., in a direction of arrow p); the shift member 174 fitted over the outer peripheral portion 184 of the ball retaining member 173 and having the ball-restricting portion 188 of the inner diameter d generally equal to the outer diameter D of the outer peripheral portion 184 and having the ball-releasing portion 191 that is formed integrally or continuously with the ball-restricting portion 188 and has a greater inner diameter than the ball-restricting portion 188; the lock/release member 126 for sliding the shift member 174 from the ball-restricting position C to the ball-releasing position E; the six power-transmitting portions 197, 202 formed on each of the left and right drive shafts 34, 35 near the shaft end 127 or 128 in such a manner that the ball members 125 are engaged in the respective recessed portions 197, 202 to effect driving power transmission; and the six non-power-transmitting portions 198, 203 formed continuously with and between the power-transmitting portions 197 or 202 in such a manner that the ball members 125 are not engaged with the non-power-transmitting portions for driving power transmission. In FIG. 12, reference numeral 206 represents a stopper ring, and 20 a retaining ring.

Next, a description will be given about behavior or operation of the differential device 32 of the present invention constructed in the above-described manner.

Figure 13A:
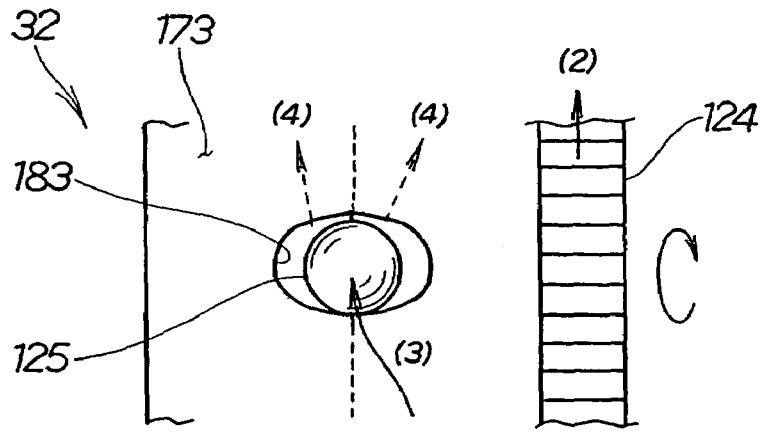
FIGS. 13A and 13B are a first set of views explanatory of operation of the differential device of the present invention.
Figure 13B:
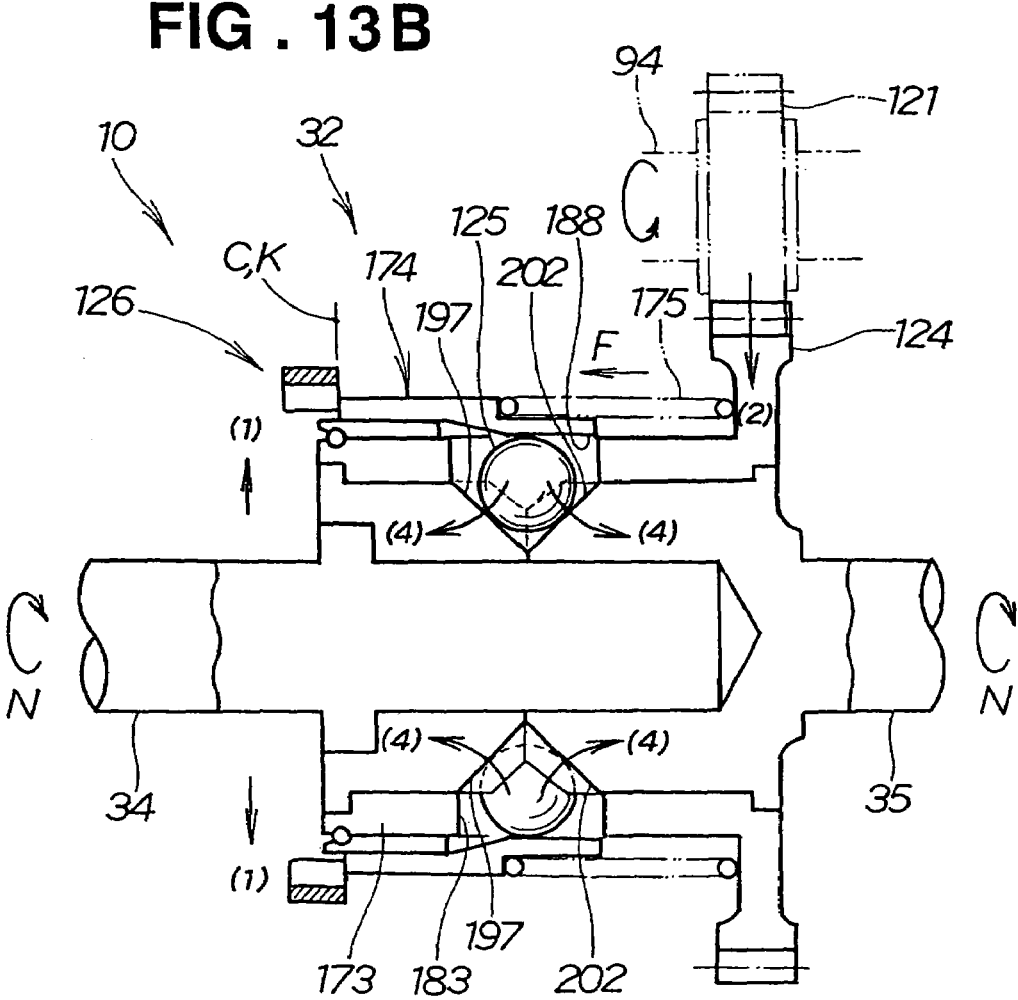

FIGS. 13A and 13B are a first set of views explanatory of the operation of the differential device 32; upper and lower directions in the figure represent the forward and rearward directions, respectively, as viewed by the human operation manipulating the handle unit 16. Specifically, FIG. 13A is a plan view representatively showing one of the holes 18 and ball members 125 of the ball retaining member 173, and FIG. 13B is a plan view of the differential device 32 particularly showing an operating position of the lock/release member 126.

When the agricultural working machine 10 is to be activated for cultivating work, the human operator shifts the operation lever 36 (FIG. 3) to the "C" (cultivating) position. At that time, the lock/release member 126 of the differential device 32 rests at the locking position K so that the shift member 174 stays at the ball-restricting position C through a resilient force F of the compression spring 175, as shown in FIG. 13B. While the shift member 174 is at the restricting position C, the ball-restricting portion 188 formed on the inner periphery of the shift member 174 contacts the ball members 125 to thereby restrict the ball members 125 from moving in a radially outward direction (i.e., in a direction of arrow ①). Thus, the ball members 125 are pressed against the power-transmitting portions 197 and 202 of the left and right drive shafts 34 and 35 in an appropriately fitted state without possibility of being accidentally disengaged from the recessed portions 197 and 202.

When driving power from the drive gear 121 of the drive shaft 94 is transmitted to the rotational member (driven gear) 124 as depicted by arrow ②, the ball retaining member 173 in the differential device 32, where movement of the ball members 125 is restricted, rotates and presses the ball members 125 through the edges of the through-hole portions 183, to transmit the power to the ball members 125 as depicted by arrow ③. The thus-pressed ball members 125 press the respective front contact surfaces 199 of the left and right power-transmitting portions 197 and 202 engaging the remaining halves of the ball members 125 to thereby transmit the power uniformly to the power-transmitting portions 197 and 202 as depicted by arrow ④ and also allow the left and light wheels to be rotated at the same rate (same number of rotations N) via the left and right drive shafts 34 and 35.

Namely, in this case, the differential device 32 operates to rotate the left and light wheels equally with the left and right drive shafts 34 and 35 completely locked with respect to each other (i.e., with the left and right drive shafts 34 and 35 held or locked in a non-differential, integrally-operating state).

As a consequence, the differential device 32 can reliably transmit the driving power to the left and right wheels without causing differential operation between the two wheels, against resistance to the rotating movement of the wheels, for example, when the wheels are buried or stuck in soft soil. Therefore, the wheels can continue rotating even when they start getting buried or stuck in the soil, which will effectively prevent the wheels from getting further buried or stuck in the soil and allow the wheels to readily get out of the soil.

Further, because the left and right wheels are rotated at the same rate (i.e., with the same number of rotations N), the behavior illustrated in relation to FIGS. 13A and 13B is optimal to linear travel of the agricultural working machine 10. The above-described behavior also takes place when the operation lever 36 is at the "W" (weeding) position.

Figure 14:
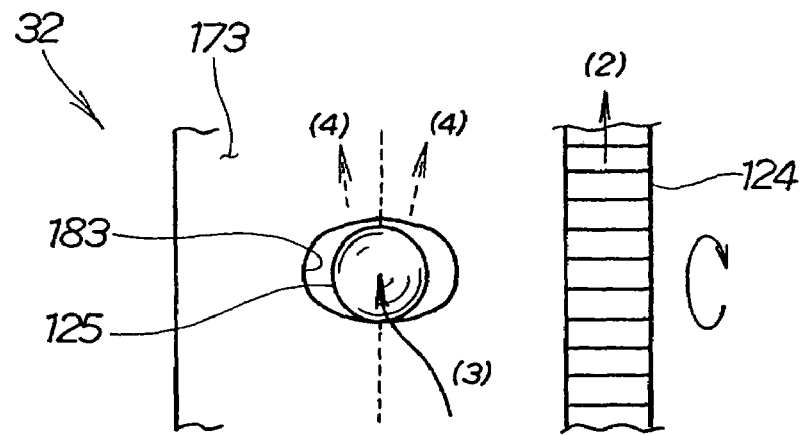
FIGS. 14A and 14B are a second set of views explanatory of the operation of the differential device of the present invention.
Figure 14:
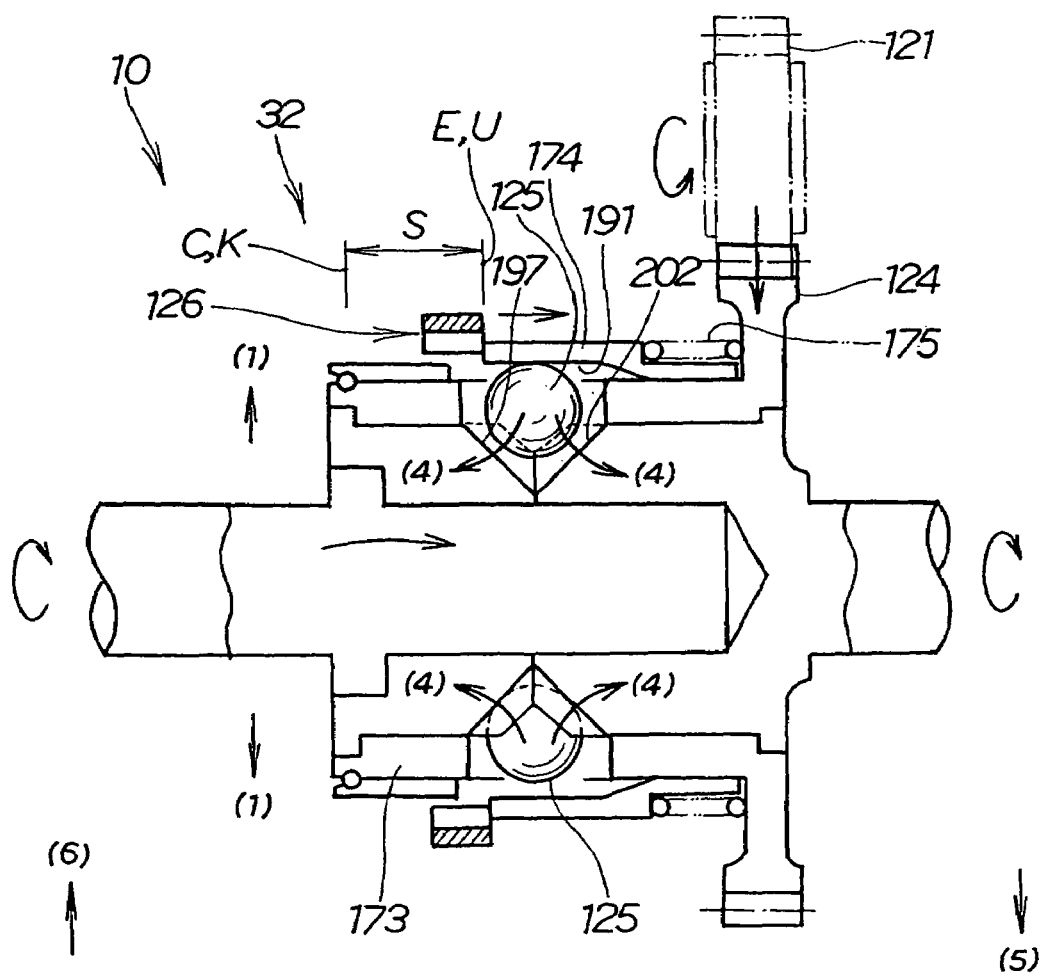

FIGS. 14A and 14B are a second set of views explanatory of the operation of the differential device 32; upper and lower directions in the figure represent the forward and rearward directions, respectively, as viewed by the human operation. Specifically, FIG. 14A is a plan view representatively showing one of the holes 18 and ball members 125 partly received in the ball retaining member 173, and FIG. 14B is a plan view of the differential device 32 particularly showing an operating position of the lock/release member 126.

When the agricultural working machine 10 is to be turned right or clockwise to make an L or U curve during cultivating work, the human operator shifts the operation lever 36 (FIG. 3) from the current "C" (cultivating) position to the "T" (turning) position. In response to the shift operation, the lock/release member 126 of the differential device 32 pivots from the locking position K to the lock releasing (or unlocking) position U, to thereby move the shift member 174 from the ball-restricting position C to the ball-releasing position E over the sliding distance S against the biasing force of the compression spring 175. In the releasing position E, the ball-releasing portion 191 of the shift member 174 provides a space in which the ball members 125 is allowed to move radially outwardly (i.e., in the direction of arrow ①). However, at this stage, the ball members 125 are still engaged in the left and right power-transmitting portions 197 and 202, so that the power from the drive gear 121 can be transmitted via the ball members 125 uniformly to the left and right recessed portions 197 and 202 as depicted by arrow ④.

Then, the human operator compulsorily directs the front end of the working machine 10 in a slightly rightward direction by pulling the right-hand portion of the operating handle unit 16 (FIG. 2) rearward as depicted by arrow ⑤ and pushing the left-hand portion forward as depicted by arrow ⑥.

Figure 15A:
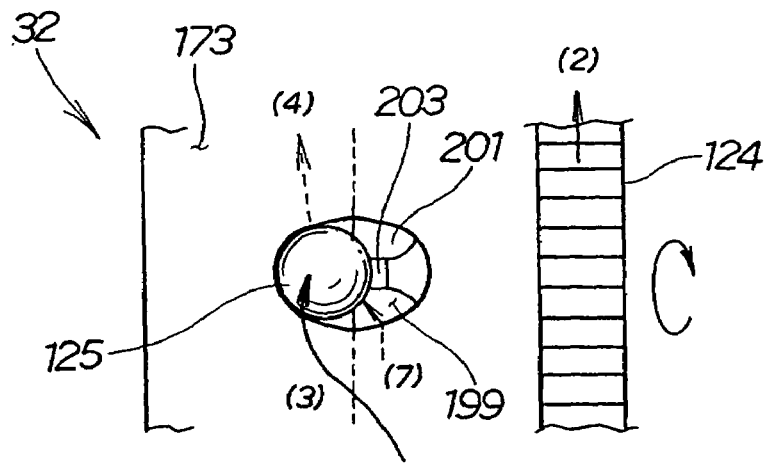
FIGS. 15A and 15B are a third set of views explanatory of the operation of the differential device of the present invention.
Figure 15B:
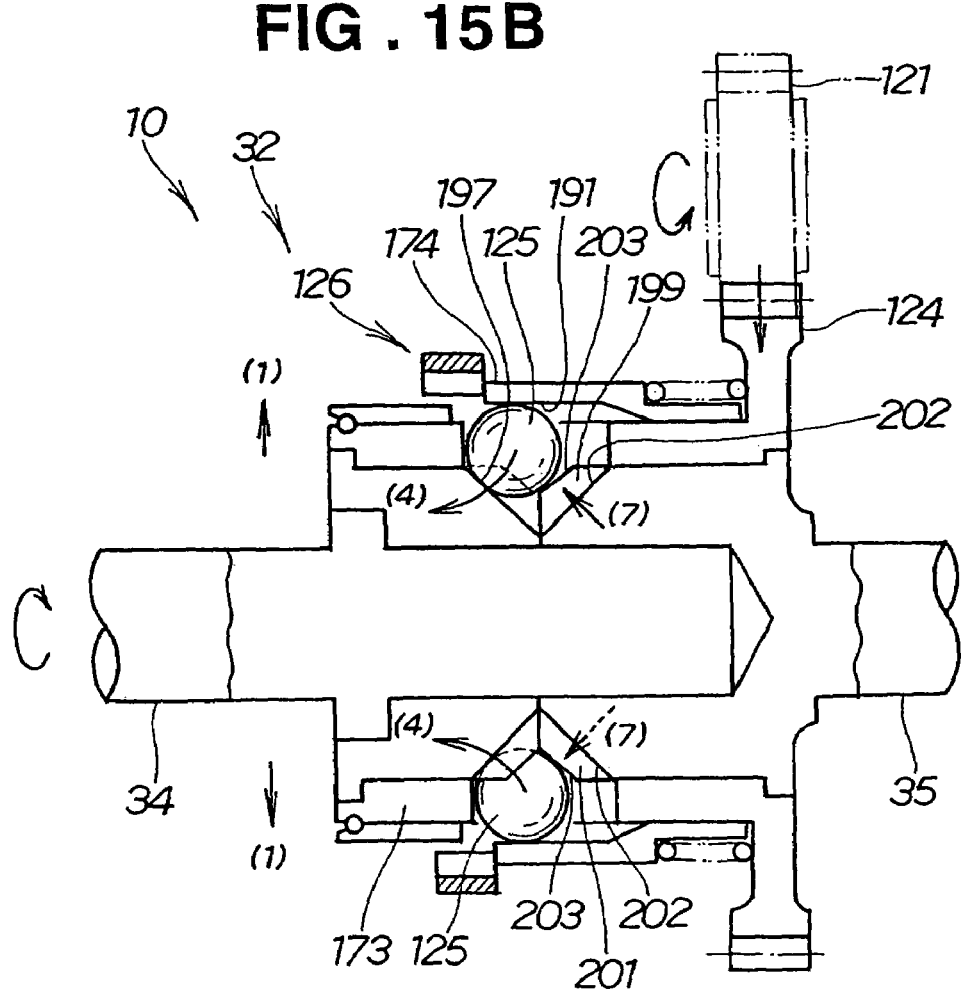

FIGS. 15A and 15B are a third set of views explanatory of the operation of the differential device 32.

Once the right-hand portion of the operating handle unit 16 has been pulled rearwardly to apply resistance to the rotation of the right wheel, the ball members 125 disengage from the right drive shaft 35, so that the differential device 35 initiates differential operation between the left and right wheels. Specifically, when a load applied from the earth to the right wheel has increased, the ball members 125, having now been made to freely move radially outwardly (i.e., in the direction of arrow ①) in the ball-releasing portion 191 of the shift member 174, are directed radially outwardly as depicted by arrow ⑦, along the slanted front contact surfaces 199 of the corresponding power-transmitting portions 202, onto the non-power-transmitting portions 203 without being engaged in the power-transmitting portions 202; namely, the power continues to be transmitted to the left drive shaft 34 as depicted by arrow ④.

The differential operation can be performed by the ball members 125 repeating such movement. Thus, when the working machine 10 is to be turned right, the differential device 32 allows the right wheel 14 (FIG. 2) to operate differentially with respect to the left wheel.

Figure 16A:
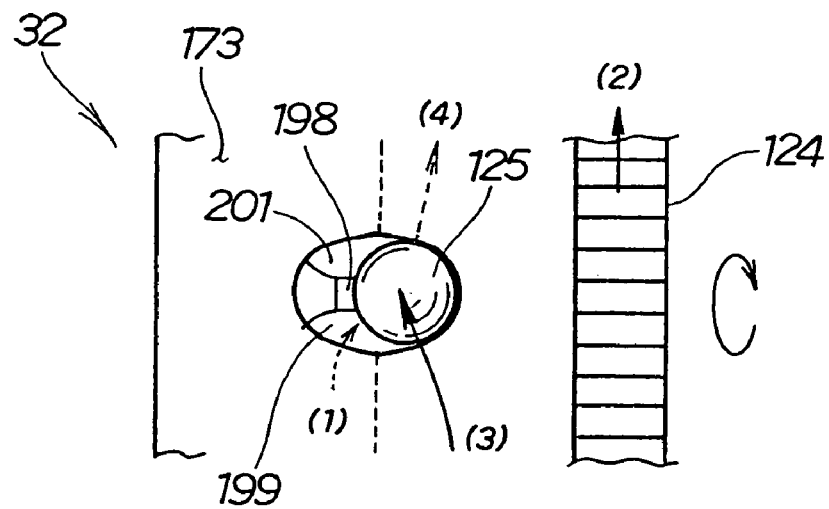
FIGS. 16A and 16B are a fourth set of views explanatory of the operation of the differential device of the present invention.
Figure 16B:
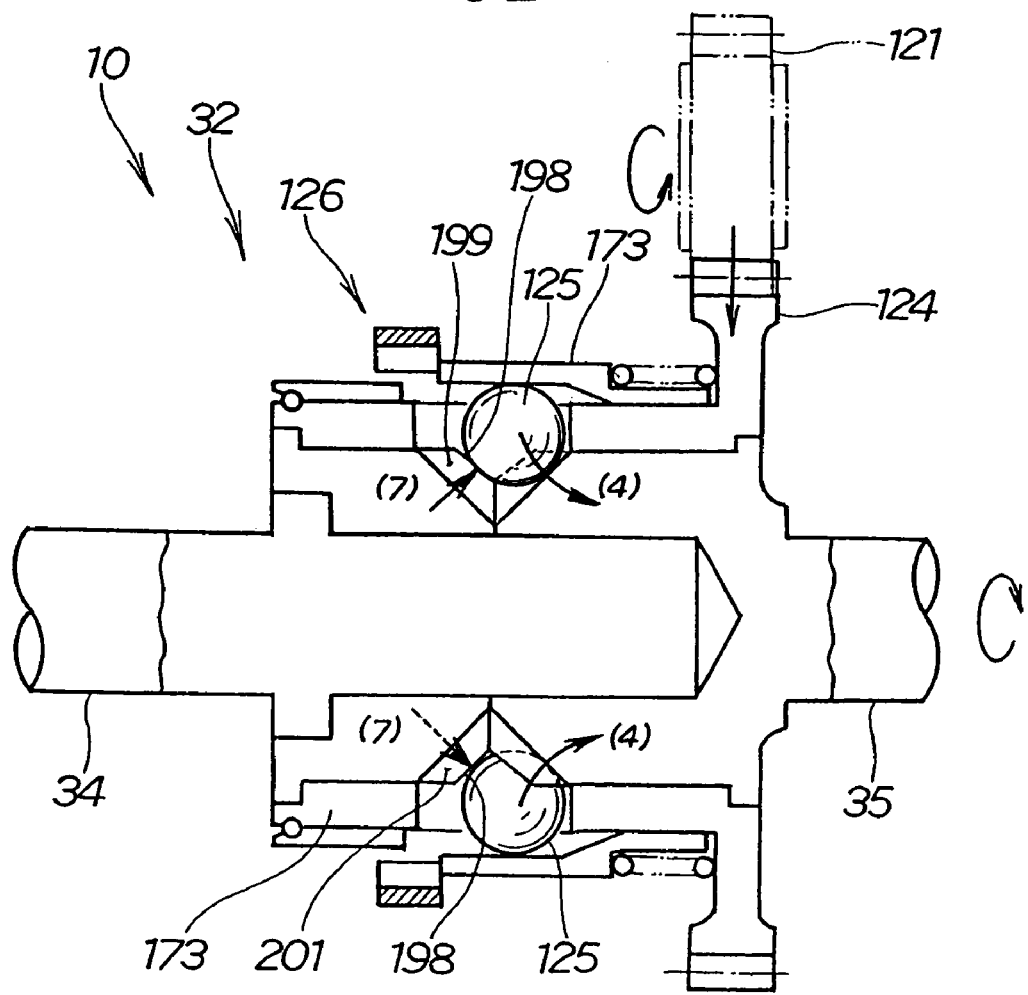
Figure 17:
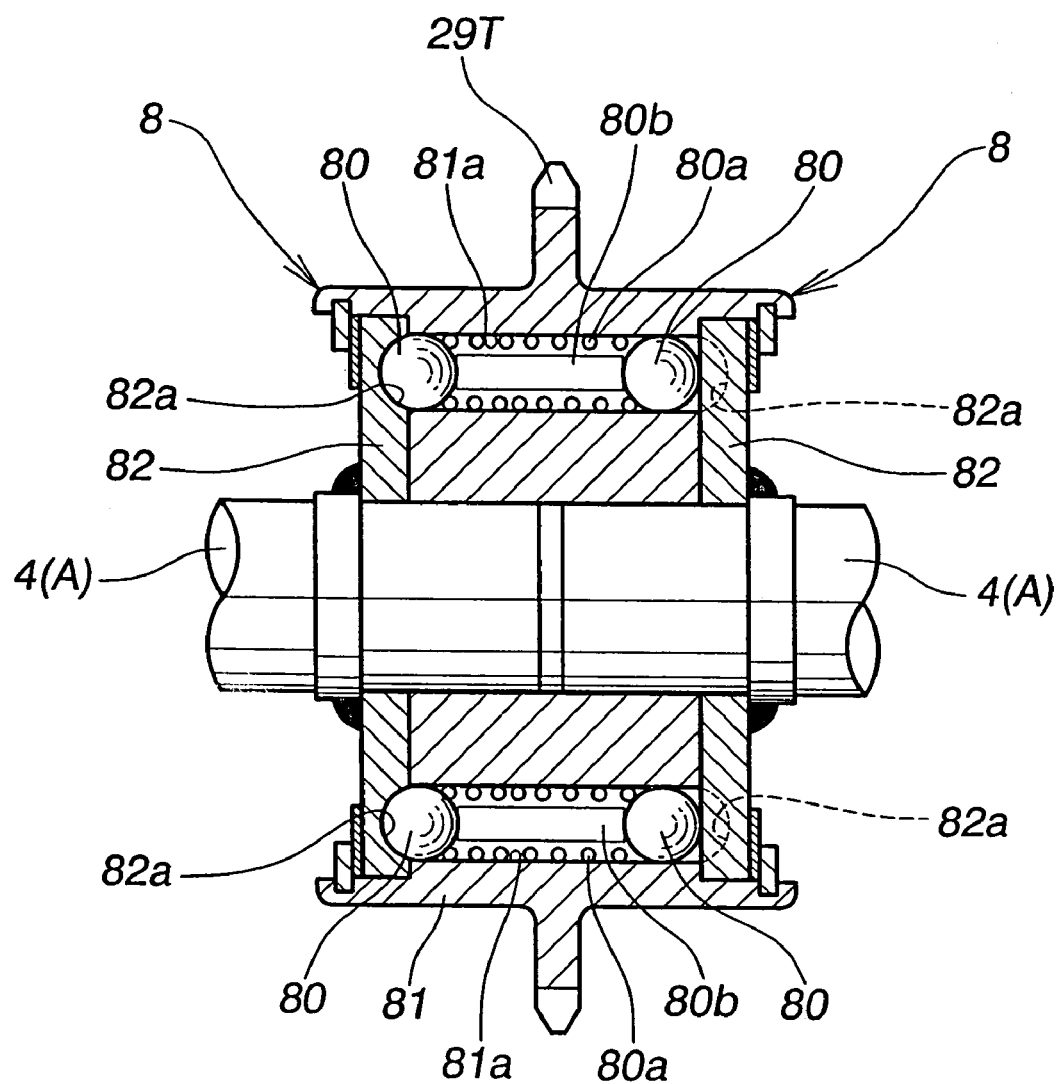
FIG. 17 is a sectional view of an agricultural working machine employing a conventional differential device.

FIGS. 16A and 16B are a fourth set of views explanatory of the operation of the differential device 32.

When the agricultural working machine 10 is to be turned left, the human operator manipulates the operating handle unit, in a manner opposite to the manner when the machine 10 is to be turned right, to apply resistance to the rotation of the left wheel, and thus the ball members 125 disengage from the left drive shaft 34, so that the differential device 35 initiates the differential operation in generally the same manner as in the right turning of the working machine, although not specifically explained here.

When the "R" (reverse) position has been selected, the differential operation between the wheels is permitted in a similar manner to the above-described Because, as illustrated in FIG. 12, the differential device 32 is merely constructed of: the ball retaining member 173 having six through-hole portions 183; the shift member 174 having the ball-restricting portion 188 and ball-releasing portion 191; the lock/release member 126; the power-transmitting portions 197 and 202 formed on the opposed axial end portions of the left and right drive shafts; and the non-power-transmitting portions 198 and 203 formed continuously with the power-transmitting portions 197, 202. Therefore, the differential device 32 of the present invention requires no high-precision processing and can be manufactured at reduced cost.

Further, with the arrangements of the differential device 32 illustrated in FIG. 11, it is possible to set a desired differential-operation limiting force for preventing the differential operation by appropriately setting the respective slanted angles γf and γr of the front and rear contact surfaces 199 and 201 of the power-transmitting portions 197. As the angles γf and γr are reduced, the differential-operation limiting force becomes greater. Reducing the angles γf and γr allows a greater driving force to be transmitted to the wheels, which can thereby achieve an enhanced traveling capability of the machine. Conversely, increasing the angles γf and γr can reducing the differential-operation limiting force.

Whereas the angle γr of the power-transmitting portions 197 of FIG. 11 has been described as set to equal the angle γf (i.e., γr=γf), it may be set to a different value from the angle γf. For example, if the angle γr is set to be smaller than the angle γf, driving power produced at the time of rearward travel of the working machine can be transmitted to the wheels with even further enhanced reliability; thus, the machine can escape, with increased ease, from earth or sand in which it has got buried or stuck.

Further, whereas the differential device 32 has been described as applied to the agricultural working machine 10, it may also be applied to other types of vehicles.

Furthermore, although the described embodiment employs a spur gear as the rotational member (driven gear 124 in the described embodiment), the rotational member may be of any other desired type, such as a sprocket. Use of the sprocket as the rotational member can effectively reduce the manufacturing cost of the differential device 32.

In summary, the differential device of the present invention arranged in the above-described manner can reliably the drive left and right wheels during the cultivating work, to thereby prevent the wheels from readily getting buried or stuck in earth and allow the wheels to readily get out from the earth even when unfortunately buried or stuck in the earth. Further, when the vehicle is to be turned, the differential device of the present invention permits appropriate differential operation between the wheels. Furthermore, the differential device of the present invention can be manufactured without requiring particular high-precision processing and at reduced cost.

Obviously, various minor changes and modifications of the present invention are possible in the light of the above teaching. It is therefore to be understood that within the scope of the appended claims the invention may be practiced otherwise than as specifically described.

What is claimed is:

1. A differential device operable selectively in a non-differential operation mode and a differential operation mode, comprising:
    a ball member;
    a ball retaining member rotatable with a driving rotational member and extending along opposed axial end portions of left and right drive shafts, said ball member being disposed between said ball retaining member and the opposed axial end portions of the left and right drive shafts, said ball retaining member having a through-hole portion formed therein to receive part of said ball member;
    a shift member fitted over said ball retaining member and including: a ball-restricting portion of an inner diameter generally equal to an outer diameter of said ball retaining member; and a ball-releasing portion having a greater inner diameter than the ball-restricting portion;
    an actuator for sliding said shift member, along said ball retaining member, from a ball-releasing position to a ball-restricting position when said non-differential operation mode is selected, but from the ball-restricting position to the ball-releasing position when said differential operation mode is selected; and
    a pair of opposed power-transmitting portions provided on respective ones of the axial ends of the left and right drive shafts and together defining a recessed portion of a predetermined sectional shape such that, when said shift member is in the ball-restricting position, said ball member is placed, via the ball-restricting portion, in engagement with the power-transmitting portions to thereby transmit a driving power from the rotational member to both of the left and right drive shafts, but, when said shift member is in the ball-releasing position, said ball member is allowed to move radially outward into engagement with only one of the power-transmitting portions to thereby permit differential rotation of the left and right drive shafts.

2. A differential device as claimed in claim 1 wherein a plurality of said ball members are provided in spaced-apart relation to each other along a circumferential direction of the axial end portions of the left and right drive shafts, and wherein a plurality of the pairs of the opposed power-transmitting portions are provided in spaced-apart relation to each other along the circumferential direction of the axial end portions, and pairs of non-power-transmitting portions are formed, on the opposed axial end portions of the left and right drive shafts, between the pairs of the power-transmitting recessed portions.

* * * * *